US010534528B2

(12) United States Patent
Mesguich Havilio

(10) Patent No.: US 10,534,528 B2
(45) Date of Patent: Jan. 14, 2020

(54) DIGITAL FLASH CARD TECHNIQUES

(71) Applicant: Barnes & Noble College Booksellers, LLC, Basking Ridge, NJ (US)

(72) Inventor: Amir Mesguich Havilio, Palo Alto, CA (US)

(73) Assignee: Barnes & Noble College Booksellers, LLC, Basking Ridge, NJ (US)

(*) Notice: Subject to any disclaimer, the term of this patent is extended or adjusted under 35 U.S.C. 154(b) by 1351 days.

(21) Appl. No.: 14/144,860

(22) Filed: Dec. 31, 2013

(65) Prior Publication Data

US 2015/0186346 A1    Jul. 2, 2015

(51) Int. Cl.
*G06F 3/00* (2006.01)
*G06F 3/0488* (2013.01)
*G06F 3/0484* (2013.01)

(52) U.S. Cl.
CPC ........ *G06F 3/0488* (2013.01); *G06F 3/04842* (2013.01)

(58) Field of Classification Search
CPC .... G06F 17/211; G06F 17/24; G06F 3/04842; G06F 17/04842
See application file for complete search history.

(56) References Cited

U.S. PATENT DOCUMENTS

| | | | |
|---|---|---|---|
| 4,896,543 A | 1/1990 | Gullman | |
| 5,494,444 A | 2/1996 | Thayer et al. | |
| 5,632,624 A * | 5/1997 | Cameron | G09B 7/02 434/308 |
| 5,633,471 A | 5/1997 | Fukushima | |
| 5,844,557 A | 12/1998 | Shively, II | |
| 6,259,438 B1 | 6/2001 | Fleck et al. | |
| 6,334,157 B1 | 12/2001 | Oppermann et al. | |
| 6,956,564 B1 | 10/2005 | Williams | |
| 7,424,669 B2 | 9/2008 | Bhogal et al. | |

(Continued)

FOREIGN PATENT DOCUMENTS

EP    0722150 A1    7/1996

OTHER PUBLICATIONS

"EPUB Canonical Fragment Identifier (epubcfi) Specification", URL: http://www.idpf.org/epub/linking/cfi/epub-cfi.html, Downloaded from the Internet on Dec. 3, 2014, 22 pages.

(Continued)

*Primary Examiner* — Stephen S Hong
*Assistant Examiner* — Marshon L Robinson
(74) *Attorney, Agent, or Firm* — Finch & Maloney PLLC

(57) ABSTRACT

Techniques are disclosed for providing a digital flash card function in electronic devices. In an embodiment, a digital flash card includes a word or phrase along with the definition of the word or phrase pulled automatically from a glossary or dictionary. The digital flash card may be created through an options menu after selecting a word or phrase, automatically whenever a word or phrase is highlighted by the user, or whenever a word or phrase is looked up. Once the flash cards have been created, they may be organized into various folders or stacks, and in some cases the flash cards may automatically be organized based on the source of the selected word or phrase. Once one or more flash cards have been created, the user may view flash cards, flip them over to view the opposite side, and scroll through the flash cards using various touch screen gestures.

20 Claims, 11 Drawing Sheets

(56) References Cited

U.S. PATENT DOCUMENTS

| | | | |
|---|---|---|---|
| 7,649,524 B2 | 1/2010 | Haim et al. | |
| 7,840,912 B2 | 11/2010 | Elias et al. | |
| 7,898,541 B2 | 3/2011 | Hong et al. | |
| RE42,738 E | 9/2011 | Williams | |
| 8,059,101 B2 | 11/2011 | Westerman et al. | |
| 8,082,505 B2 | 12/2011 | Meimer et al. | |
| 8,239,413 B2 | 8/2012 | Hubert | |
| 8,274,536 B2 | 9/2012 | Chaudhri et al. | |
| 8,286,104 B1 | 10/2012 | Yonge-Mallo | |
| D670,713 S | 11/2012 | Cranfill et al. | |
| 8,332,747 B2 | 12/2012 | Carro et al. | |
| RE44,103 E | 3/2013 | Williams | |
| 8,400,417 B2 | 3/2013 | Ording et al. | |
| 8,447,697 B2 | 5/2013 | Wang et al. | |
| 8,508,494 B2 | 8/2013 | Moore | |
| 8,761,660 B2 | 6/2014 | Libin | |
| 9,256,588 B1 | 2/2016 | Moscovich et al. | |
| 9,275,028 B2 | 3/2016 | Migos et al. | |
| 9,317,669 B1 | 4/2016 | Gray | |
| 2001/0025289 A1 | 9/2001 | Jenkins et al. | |
| 2002/0116421 A1 | 8/2002 | Fox et al. | |
| 2003/0002086 A1 | 1/2003 | Thomason | |
| 2003/0076352 A1* | 4/2003 | Uhlig | G06F 17/241 715/738 |
| 2003/0229858 A1 | 12/2003 | Keohane et al. | |
| 2004/0148503 A1 | 7/2004 | Sidman | |
| 2004/0219494 A1* | 11/2004 | Boon | G09B 5/065 434/156 |
| 2005/0273378 A1 | 12/2005 | MacDonald-Korth et al. | |
| 2006/0040242 A1 | 2/2006 | Mejia | |
| 2006/0154225 A1* | 7/2006 | Kim | A63F 3/00006 434/322 |
| 2006/0183099 A1 | 8/2006 | Feely et al. | |
| 2007/0047002 A1 | 3/2007 | Hull et al. | |
| 2007/0226260 A1* | 9/2007 | Williams | G06F 17/30056 |
| 2007/0269044 A1 | 11/2007 | Bruestle | |
| 2007/0269788 A1 | 11/2007 | Flowers et al. | |
| 2008/0036747 A1 | 2/2008 | Hope | |
| 2009/0064028 A1* | 3/2009 | Garvey | G06Q 30/02 715/781 |
| 2009/0077479 A1 | 3/2009 | Tucci | |
| 2009/0083637 A1* | 3/2009 | Skakkebaek | G06Q 10/10 715/751 |
| 2009/0253113 A1 | 3/2009 | Tuve | |
| 2009/0111084 A1 | 4/2009 | McCarty | |
| 2009/0248960 A1* | 10/2009 | Sunderland | G06F 17/30 711/103 |
| 2009/0295088 A1 | 12/2009 | Chan | |
| 2010/0100854 A1 | 4/2010 | Russell et al. | |
| 2010/0192086 A1 | 7/2010 | Kocienda et al. | |
| 2010/0229130 A1 | 9/2010 | Edge et al. | |
| 2010/0259482 A1 | 10/2010 | Ball | |
| 2010/0262659 A1 | 10/2010 | Christiansen et al. | |
| 2010/0313137 A1 | 12/2010 | Fein et al. | |
| 2010/0318895 A1 | 12/2010 | Steinberger et al. | |
| 2011/0097698 A1 | 4/2011 | Henderson | |
| 2011/0125867 A1* | 5/2011 | Denk, Jr. | G06Q 30/02 709/217 |
| 2011/0195391 A1* | 8/2011 | Stone | G09B 19/02 434/365 |
| 2011/0258542 A1 | 10/2011 | Kenney et al. | |
| 2011/0318723 A1* | 12/2011 | Jeong | G09B 7/08 434/350 |
| 2012/0052478 A1 | 3/2012 | Reid | |
| 2012/0056821 A1 | 3/2012 | Goh | |
| 2012/0127110 A1 | 5/2012 | Amm et al. | |
| 2012/0139879 A1 | 6/2012 | Kim et al. | |
| 2012/0197688 A1 | 8/2012 | Townshend et al. | |
| 2012/0221938 A1 | 8/2012 | Patterson et al. | |
| 2012/0235901 A1 | 9/2012 | Binder | |
| 2012/0240025 A1 | 9/2012 | Migos et al. | |
| 2012/0242579 A1 | 9/2012 | Chua | |
| 2012/0242584 A1 | 9/2012 | Tuli | |
| 2012/0249768 A1 | 10/2012 | Binder | |
| 2012/0251994 A1 | 10/2012 | Gray | |
| 2012/0280947 A1 | 11/2012 | Weaver et al. | |
| 2012/0288846 A1* | 11/2012 | Hull | G09B 5/14 434/365 |
| 2012/0311438 A1 | 12/2012 | Cranfill et al. | |
| 2012/0329529 A1 | 12/2012 | van der Raadt | |
| 2013/0016045 A1 | 1/2013 | Zhao et al. | |
| 2013/0036383 A1 | 2/2013 | Yuan et al. | |
| 2013/0047115 A1 | 2/2013 | Migos et al. | |
| 2013/0063364 A1 | 3/2013 | Moore | |
| 2013/0076632 A1 | 3/2013 | Sirpal et al. | |
| 2013/0076637 A1 | 3/2013 | Teltz | |
| 2013/0076638 A1 | 3/2013 | Sirpal et al. | |
| 2013/0076781 A1 | 3/2013 | Sirpal et al. | |
| 2013/0095464 A1 | 4/2013 | Ediger et al. | |
| 2013/0113699 A1 | 5/2013 | Lim | |
| 2013/0120271 A1 | 5/2013 | Lee et al. | |
| 2013/0135234 A1 | 5/2013 | Hisano et al. | |
| 2013/0139078 A1 | 5/2013 | Chuang et al. | |
| 2013/0139107 A1 | 5/2013 | Jung | |
| 2013/0162532 A1 | 6/2013 | Cheng et al. | |
| 2013/0185680 A1 | 7/2013 | Chaudhri et al. | |
| 2013/0194308 A1 | 8/2013 | Privault et al. | |
| 2013/0277915 A1 | 10/2013 | Garrett | |
| 2013/0342470 A1* | 12/2013 | Acar | G09B 5/062 345/173 |
| 2014/0089775 A1 | 3/2014 | Worsley et al. | |
| 2014/0162243 A1* | 6/2014 | Lamkin | G09B 5/08 434/365 |
| 2015/0074397 A1 | 3/2015 | Dube et al. | |
| 2015/0106760 A1 | 4/2015 | Axelsson et al. | |
| 2015/0170115 A1 | 6/2015 | Lacek | |
| 2015/0228197 A1 | 8/2015 | McKinney et al. | |
| 2015/0304387 A1* | 10/2015 | Landau | H04L 67/025 715/740 |
| 2016/0018968 A1 | 1/2016 | Wilson et al. | |
| 2016/0188558 A1 | 6/2016 | Shikawa et al. | |

OTHER PUBLICATIONS

"Flashcard", Wikipedia, the free encyclopedia, URL: http://en.wikipedia.org/wiki/Flashcard, Downloaded from the Internet on Dec. 3, 2014, 4 pages.

"List of Flashcard Software", Wikipedia, the free encyclopedia, URL: http://en.wikipedia.org/wiki/List_of_flashcard_software, Downloaded from the Internet Dec. 31, 2014, 2 pages.

"Adonit Jot Touch (for iPad)," Adonit Jot Touch (for iPad) Review & Rating—PCMag.com; http://www.pcmag.com/article2/0,2817,2411192,00.asp; printed from the Internet on Jun. 20, 2013, 6 pages.

Volpe, Joseph, Amazon patents intelligent pen for adding annotations to digital and printed media (updated), http://www.engadget.com/2012/03/06/amazon-patents-intelligent-pen/, posted Mar. 6, 2012 at 5:39 PM, 3 pages.

"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, published Feb. 28, 2013, 13 pages.

"Bamboo Stylus," Wacom Americas, http://www.wacom.com/en/products/stylus, printed from the Internet on Jun. 20, 2013, 5 pages.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, printed from the Internet on Aug. 2, 2013, 1 page.

Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929—Sep. 10, 2004, 10 pages.

"Pen," DuoSense Pen, N-trig Hands-on computing, http://www.n-trig.com/Content.aspx?Page=DigitalPencil, printed from the Internet on Jun. 20, 2013, 3 pages.

"Easing functions," Easing Functions Cheat Sheet, http://easings.net/, printed from the Internet on Jun. 17, 2013, 3 pages.

(56) References Cited

OTHER PUBLICATIONS

Kirupa, Easing Functions (aka Timing Functions) in CSS3, http://www.kirupa.com/html5/easing_functions_css3.htm, published Apr. 3, 2013, 16 pages.
"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, printed from the Internet on Aug. 2, 2013, 5 pages.
"Simultaneous Pen & Touch: The Natural Way to Work," Perceptive Pixel Active Stylus, www.perceptivepixel.com/_literature_136086/Active_Stylus, printed from the Internet on Dec. 14, 2012, 2 pages.
"Future Apple Notebooks & Tablets may use Acoustic Commands—Patently Apple," http://www.patentlyapple.com/patently-apple/2011/02/future-apple-notebooks-tablets-may-use-acoustic-commands.html, published Feb. 18, 2011, 6 pages.
"Guidelines for selecting text and images (Windows Store apps)," http://msdn.microsoft.com/en-us/library/windows/apps/hh465334, printed from the Internet on Jun. 20, 2013, 5 pages.
Lutz, Zachary, "Hands-on with wireless, ultrasonic stylus an touchless gestures at MWC (video)," http://www.engadget.com/2012/03/01/hands-on-with-wireless-ultrasonic-stylus-and-touchless-gestures/, posted Mar. 1, 2012 at 8:28 AM, 3 pages.
"HEX3 JaJa Pressure Sensitive Stylus," HEX3 JaJa Pressure Sensitive Stylus Review & Rating—PCMag.com, http://www.pcmag.com/article2/0,2817,2411194,00.asp, printed from the Internet on Jun. 20, 2013, 6 pages.
"How do WACOM tablets work?," tablet4u.co.uk, http://www.tablet4u.co.uk/techinfo.html, printed from the Internet on Jun. 20, 2013, 2 pages.
Kim, Arnold, "Multi-Touch Page Flipping eBook Concept Shown on an iPad," http://www.macrumors.com/2012/01/23/multi-touch-page-flipping-ebook-concept-shown-on-an-iPad/, posted Jan. 22, 2012 at 10:52 PM, 6 pages.
"Desktop Touchscreens,"—Desktop touchscreens explained, http://www.touchscreenmagazine.nl/touchscreen-solutions/desktop-touthscreens, printed from the Internet on Nov. 3, 2012, 1 page.
"MTStylus Wireless Stereo Stylus for iPhone/Andriod Phone & Tablet," dexim-MTStylus Wireless Stereo Stylus, http://www.dexim.net/content.php?id=165&pid=11, printed from the Internet on Jun. 20, 2013, 2 pages.
"Padblue 2," BRANDO—mobile.brando.com, http://mobile.brando.com/Padblue-2_p9162c1577d94.html., printed from the Internet on May 10, 2013, 4 pages.
Fingas, Jon, "Panasonic mobile devices to use Anoto's pattern-based pen input technology," http://www.engadget.com/2013/01/08/panasonic-mobile-devices-to-use-anoto-pattern-pen-input/, posted Jan. 8, 2013 at 1:00 PM, 4 pages.
"Bluetooth 4.0 SmartPen the future just got a little brighter," Pogo Connect, http://tenonedesign.com/connect.php, printed from the Internet on Jun. 20, 2013, 7 pages.
Quick, Darren, "Pressure sensitive technology set to bring 3D capability to touchscreens," Mobile Technology, http://www.gizmag.com/new-touchscreen-technology, published on Jan. 31, 2010, 4 pages.
Rigg, Jamie, "Sony tries to patent stylus with friction-based haptic feedback," http://www.engadget.com/2012/11/22/sony-haptic-feedback-stylus-patent/, posted on Nov. 22, 2012 at 9:50 AM, 2 pages.
"Stylus Hanging Bluetooth Headset," BRANDO—mobile.brando.com, http://mobile.brando.com/prod_detail.php?prod_id=03291, printed from the Internet on May 10, 2013, 4 pages.
"The JukeStyle is a great budget stylus for your iOS devices," stylus Archives—iPad News, http://www.ipadnews.nl/tag/stylus/, printed from the Internet on Jun. 20, 2013, 44 pages.
Lavrinc, Damon, "Why Flipping Through Paper-Like Pages Endures in the Digital World," Gadget Lab, http://www.wired.com/gadgetlab/2012/05/why-flipping-through-paper-like-pages-endures-in-the-digital-world/, posted on May 11, 2012 at 3:48 PM, 5 pages.
Bragdon, et al., "Experimental Analysis of Touch-Screen Gesture Designs in Mobile Environments", CHI 2011—Session: Gestures, May 7-12, 2011, Vancouver, BC, Canada. Copyright 2011 ACM 978-1-4503-0267—Aug. 11, 2005, pp. 403-412.
"Gesture Search for Google Mobile", Google Mobile, www.google.com/mobile/gesture-search, printed from the Internet on Dec. 26, 2012, 1 page.
"Comics by comiXology," Comic Book Reader Guide, http://www.comicbookreaderguide.com/comics-by-comixology/, printed from the Internet on May 6, 2013, 24 pages.
"NFC Forum: Frequently Asked Questions," http://www.nfc-forum.org/resources/faqs#acknowledge, printed from the Internet on Feb. 18, 2013, 11 pages.
"How to Remote Wipe an iPhone or iPad," OSXDaily, http://osxdaily.com/2012/06/05/remote-wipe-iphone-or-ipad/, published Jun. 5, 2012, 4 pages.
"Screen hotspot," Wikipedia, the free encyclopedia, http://en.wikipedia.org/wiki/Screen_hotspot, printed from the Internet on May 15, 2013, 1 page.
"PAiA-Touch Switches," copyright 2006 PAiA Corporation USA, http://www.paia.com/ProdArticles/touchsw.html, printed from the Internet on Aug. 27, 2013, 3 pages.
Kanai, et al., "Intra-Rendition Navigation," Copyright 2012-2013 International Digital Publishing Forum (IDPF), 13 pages.
"Explaining how the sPen tech works (and is very diff than other styluses)," http://forum.xda-developers.com/showthread.php?t=1439369, posted Jan. 11, 2012, 8:20 AM, 1 page.
"Navigation Drawer," http://developer.android.com/design/patterns/navigation-drawer.html, downloaded from the internet on Dec. 20, 2013, 14 pages.

* cited by examiner

DIGITAL FLASH CARD TECHNIQUES

FIELD OF THE DISCLOSURE

This disclosure relates to electronic display devices, and more particularly, to user interface (UI) techniques for interacting with computing devices.

BACKGROUND

Electronic display devices such as tablets, eReaders, mobile phones, smart phones, personal digital assistants (PDAs), and other such touch screen electronic display devices are commonly used for displaying consumable content. The content may be, for example, one or more eBooks, images, video or music files, document files, an online article or blog, a map, just to name a few types. Such display devices are also useful for displaying a user interface that allows a user to interact with an application running on the device. The user interface may include, for example, one or more touch screen controls and/or one or more displayed labels that correspond to nearby hardware buttons. The touch screen display may be backlit or not, and may be implemented for instance with an LED screen or an electrophoretic display. Such devices may also include other touch sensitive surfaces, such as a track pad (e.g., capacitive or resistive touch sensor) or touch sensitive housing (e.g., acoustic sensor).

DETAILED DESCRIPTION

Figure 1A:
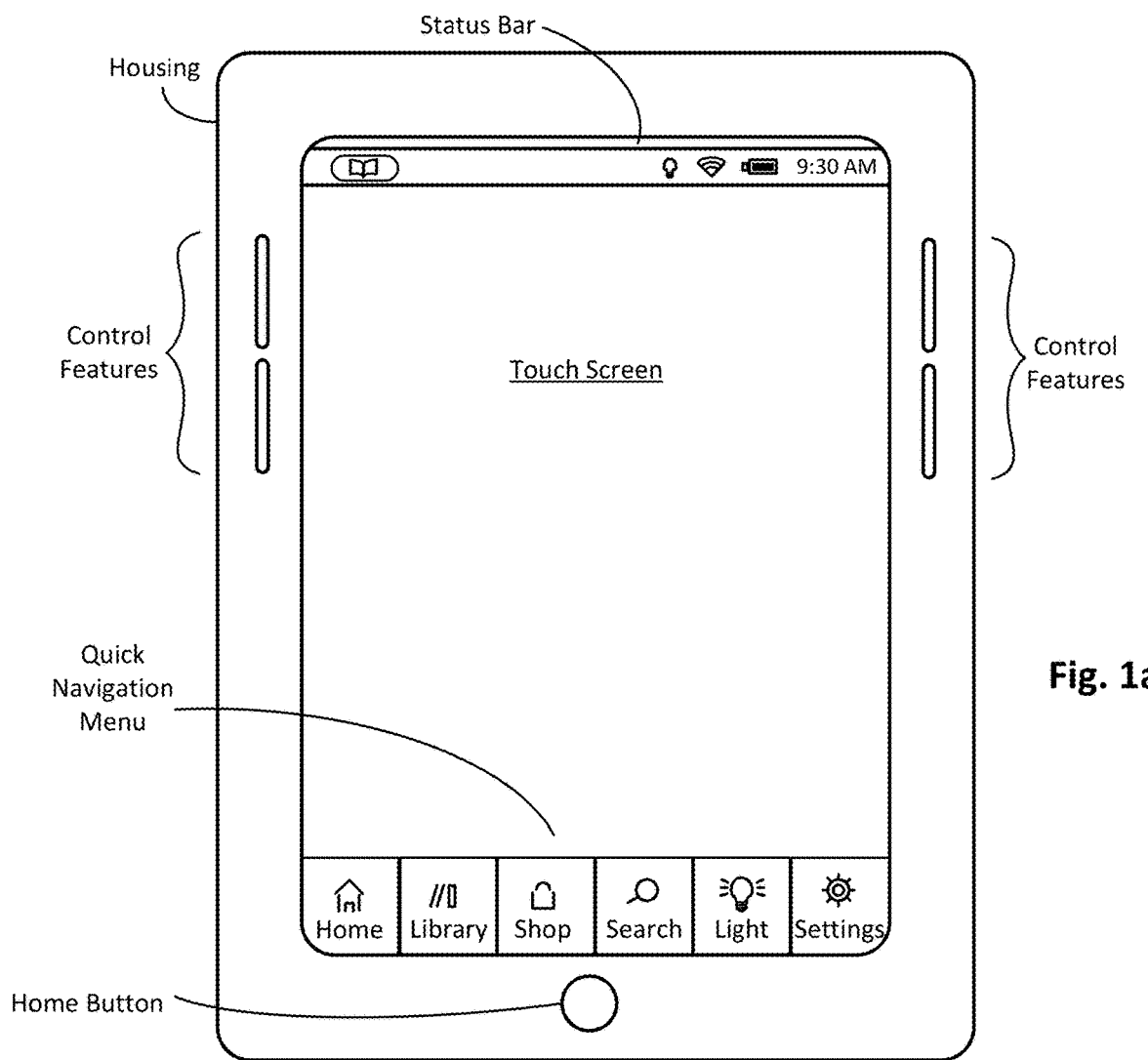
FIGS. 1a-b illustrate an example electronic touch screen device having a digital flash card function configured in accordance with an embodiment of the present invention.

Techniques are disclosed for providing a digital flash card function in electronic computing devices, such as a touch screen device. In an embodiment, a digital flash card includes a word or phrase on one side of the flash card along with the definition of the word or phrase on the other side of the flash card, wherein the definition can be, for example, pulled automatically from a glossary or dictionary. In a more general sense, the digital flash card may include a question-answer construct within a given context, wherein there is a word or phrase on one side of the flash card indicative of the question portion of the construct and an answer appropriate for the given context on the other side of the flash card. To this end, a word or phrase as used herein may include letters, numbers, symbols or other characters and any combinations thereof. For example, if the given context is learning a language, then the question portion of the question-answer construct can be a word or phrase and the answer portion of the construct can be the translation of that word/phrase. Similarly, if the given context is learning chemistry, then the question portion of the question-answer construct can be an element name or chemical compound and the answer portion of the construct can be the chemical symbol of that element or compound. Numerous such question-answer constructs and contexts will be apparent in light of this disclosure. In any such cases, the selected word or phrase can be highlighted (e.g., yellowed) by the user, thereby indicating the user's specific interest in that word/phrase, as contrasted to more general highlighting of entire sentences and blocks of text or content. The digital flash card mode may automatically pull an answer from a dictionary or other data source to create a flash card whenever a word or phrase is highlighted by the user, whenever a word or phrase is looked up, or when a flash card option is chosen from an options menu after a word or phrase is selected by the user. In one specific embodiment, the digital flash card mode automatically activates in response to: (1) a highlighting function or mode being activated (e.g., where the user is changing the color of content to highlight it); and (2) the highlighted content including a word or phrase (letters, numbers, symbols or other characters and any combinations thereof). The flash cards may be organized into various folders or stacks based on, for example, subject, course, semester, eBook, etc. In some embodiments, the flash cards may automatically be organized into groups based on the source of the selected word or phrase. Such organization allows the user to review all flash cards associated with a given topic or source, and in an academic setting may aid the user in studying for specific courses. Once one or more flash cards have been created, the user may view the flash cards, flip them over to view the opposite side of the cards, and scroll through the flash cards using various touch screen gestures. In some embodiments, graphics, animations, and/or sound effects may accompany the scrolling and flipping over of the digital flash cards. In some embodiments, if the user concludes that further review is no longer needed, a flash card may be deleted by selecting a touch screen UI feature or pressing the delete key of a physical or virtual keyboard.

General Overview

As previously explained, electronic display devices such as tablets, eReaders, and smart phones are commonly used for displaying user interfaces and consumable content. The user of such devices can typically consume the displayed content with relative ease. While general functions suitable for looking up and viewing word definitions may be available in some electronic devices, an automatic digital flash card function as described herein may provide a more intuitive or otherwise positive user experience.

Thus, and in accordance with an embodiment of the present invention, digital flash card creation and viewing techniques are disclosed for use in electronic touch screen devices. In some cases, highlighting a single word or short phrase (e.g., 1-3 words), as contrasted to more general highlighting of entire sentences or blocks of text or content, indicates the user's specific interest in learning and remembering that word/phrase. Thus, in some embodiments the digital flash card function may include a flash card creation mode that allows a user to highlight a word or phrase (either of which may include letters, numbers, symbols, or other characters, and any combinations thereof) displayed on an electronic device and automatically create a digital flash card including the word or phrase along with the meaning of the highlighted word or phrase. Highlighting a word or phrase may include, for example, coloring the word/phrase much like physically highlighting text in a book, underlining, changing the font color, or otherwise altering the appearance and/or formatting settings of the word or phrase. In some cases, a word or phrase may be highlighted using a tap or a tap-and-drag gesture on a touch screen surface, or any other suitable highlighting mechanism (e.g., double-click of word using a mouse or a click-hold-and-drag mouse action). In some embodiments, the flash card creation mode may pull the definition of a word or phrase from, for example, a glossary, dictionary, and/or encyclopedia that may be saved on the electronic device, on a network or on a remote server (e.g., Wikipedia or other informational data source), or from a glossary within the content being consumed (e.g., glossary of a textbook that is being read by a student that has highlighted the word or phrase). As discussed above, the meaning of the word or phrase (i.e., the answer portion of the flash card) could be, for example, a dictionary definition, a translation, a formula solution, or any other answer responsive to the highlighted word/phrase within a given context. For ease of description, examples are provided below within the context of a dictionary definition, wherein the question portion of the question-answer construct is a highlighted word or phrase and the answer portion of the question-answer construct is the definition of the highlighted word or phrase.

A digital flash card may be created automatically whenever a word or short phrase is highlighted, or through an options menu, in some embodiments. In other embodiments, a digital flash card may be automatically created whenever a word or phrase is looked up. In any such cases, the flash card is created with the highlighted word or phrase on one side and the definition of the word or phrase, automatically pulled from a glossary or dictionary, on the other side. Once a flash card has been created, it may be saved on the electronic device along with other user-created flash cards, and in some embodiments the cards may be organized into separate folders or stacks. In some embodiments, the flash cards may be saved by default into a folder based on its source, subject, eBook, chapter, assignment number, etc. In such embodiments, a user may create a number of flash cards while reading a class textbook, and all flash cards created from that book will be saved in a separate folder for future review.

The digital flash card function may also include a flash card viewing mode which allows the user to view the text and definitions of the various flash cards created in the flash card creation mode. For example, while viewing the word or phrase side of the flash card, the user can attempt to recall its meaning, and can then review the definition by flipping the flash card using a flip gesture. In some embodiments, a user may enter the flash card viewing mode by accessing flash card files from a file browser and/or navigation menu. In other embodiments, while consuming digital content on the device, the user may access an options menu and choose to view the flash cards associated with the digital content currently being consumed. For example, while reading an eBook or reviewing class notes on the electronic device, the user may access an options menu including an option to view all flash cards associated with that eBook, class, assignment number, or chapter. In such an example, the flash card viewing mode will then begin displaying the appropriate flash cards so that the user may review vocabulary and/or terms and phrases from the eBook or class notes, as the case may be.

As previously explained, the flash card viewing mode may be associated, in some embodiments, with a card flip gesture that flips the flash card over to reveal the definition of a given word or phrase. Furthermore, the flash card viewing mode may also be associated with a card scrolling gesture that allows the user to move to the next or previous flash card, or otherwise scroll through the digital flash cards, in some embodiments. The card flip gesture and/or card scrolling gesture may be associated with any number of touch screen gestures, and in one embodiment a single tap on a flash card flips it over while a horizontal swipe gesture performed over a flash card displays the next or previous flash card, depending on the direction of the swipe gesture. Other embodiments may use different gestures, such as a two-contact swipe gesture, a distinguishable tap gesture, or any other recognizable gesture that can be used to distinctly indicate that either the next or previous flash card or the definition of the current flash card is desired. In some embodiments, flipping the flash card over to display the definition of a word or phrase may be accompanied by a suitable animation, such as one graphically showing the card flipping over to display the definition. Moving to the next or previous flash card may also be accompanied by a suitable animation, in some embodiments, such as one showing the current card gliding off the screen and the next card appearing from the right margin of the screen. Other suitable animations, graphics, and/or sound effects may accompany the flash card scrolling and/or flipping functions.

As used herein, a swipe gesture may include a sweeping or dragging gesture across at least a portion of the touch sensitive surface; whether directly contacting that surface or hovering over that surface (e.g., within a few centimeters or otherwise close enough to be detected by the touch sensitive surface). In some embodiments, the swipe gesture may be performed at a constant speed in one single direction, while in other embodiments the swipe gesture may follow a curved path or a path. The gestures can be performed, for example, with the tip of a finger or a stylus, or any other suitable implement capable of providing a detectable swipe gesture. Given the global nature and/or uniqueness of the engagement mechanism, in accordance with some example embodiments, the digital flash card function can be similarly invoked within multiple diverse applications (e.g., document viewer, browser, picture viewer, eReader, etc.) and without conflicting with other global gestures that might also be used by the device's operating system. Various types of digital content can benefit from the flash card function described herein. For example, the digital content may include a digital catalogue, magazine, comics, eBook, text document, and/or other digital content that may be accessed through the UI of a digital computing device.

In some embodiments, in order to provide the user with the context of the word or phrase being reviewed, the flash card viewing mode may bring the user to the appropriate page from which the word or phrase was selected. In some embodiments the word or phrase may be highlighted to the user in order to quickly review the context in which the word or phrase was used. The flash card viewing mode may navigate to the appropriate page and highlight the selected word or phrase either while the word or phrase itself is being displayed to the user, or after the user has flipped the flash card over to see the definition. As will be appreciated, the term 'highlighted' as used herein refers to content being selected, and does not necessarily mean that a formatting change to the content has been executed. For instance, content can be selected/highlighted, and then a formatting change (e.g., bolding and/or color) can be executed on that selected content, if so desired. In this sense, highlighting may refer to, for example, any indication of a content selection, which may or may not include a formatting change.

The techniques have a number of advantages, as will be appreciated in light of this disclosure. For instance, in some cases, the techniques can be employed to provide an intuitive way for a student to automatically create personalized flash cards for studying, wherein the user does not have to manually type in the term or phrase or the definition. In some such embodiments, a student can look up words or terms from a digital textbook, lecture notes, slides, or other digital classroom materials and those words or terms will be saved as flash cards for later studying. In such cases, for instance, the flash cards can be saved in a virtual "stack" of cards along with the user's other digital flash cards, or they may be organized by class, semester, textbook, etc., in some embodiments. In a more general sense, techniques can be employed to provide an intuitive way for a user to create personalized digital flash cards from educational materials or other digital content.

Architecture

Figure 1B:
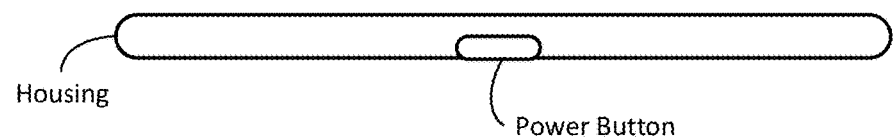

FIGS. 1a-b illustrate an example electronic touch sensitive device having a digital flash card function configured in accordance with an embodiment of the present invention. As can be seen, in this example embodiment, the touch sensitive surface is a touch screen display. The device could be, for example, a tablet such as the NOOK® tablet or eReader by Barnes & Noble. In a more general sense, the device may be any electronic device having a touch sensitive user interface for detecting direct touch or otherwise sufficiently proximate contact, and capability for displaying content to a user, such as a mobile phone or mobile computing device such as a laptop, a desktop computing system, a television, a smart display screen, or any other device having a touch sensitive display or a non-sensitive display screen that can be used in conjunction with a touch sensitive surface. As will be appreciated in light of this disclosure, the claimed invention is not intended to be limited to any specific kind or type of electronic device or form factor.

As can be seen with this example configuration, the device comprises a housing that includes a number of hardware features such as a power button, control features, and a press-button (sometimes called a home button herein). A user interface is also provided, which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such UI features, or different UI features altogether, depending on the target application of the device. Any such general UI controls and features can be implemented using any suitable conventional or custom technology, as will be appreciated.

The hardware control features provided on the device housing in this example embodiment are configured as elongated press-bars and can be used, for example, to page forward (using the top press-bar) or to page backward (using the bottom press-bar), such as might be useful in an eReader application. The power button can be used to turn the device on and off, and may be used in conjunction with a touch-based UI control feature that allows the user to confirm a given power transition action request (e.g., such as a slide bar or tap point graphic to turn power off). Numerous variations will be apparent, and the claimed invention is not intended to be limited to any particular set of hardware buttons or UI features, or device form factor.

In this example configuration, the home button is a physical press-button that can be used as follows: when the device is awake and in use, pressing the button will display the quick navigation menu, which is a toolbar that provides quick access to various features of the device. The home button may also be configured to cease an active function that is currently executing on the device (such as a digital flash card function), or close a configuration sub-menu that is currently open. The button may further control other functionality if, for example, the user presses and holds the home button. For instance, an example such push-and-hold function could engage a power conservation routine where the device is put to sleep or an otherwise lower power consumption mode. So, a user could grab the device by the button, press and keep holding as the device is stowed into a bag or purse. Thus, one physical gesture may safely put the device to sleep. In such an example embodiment, the home button may be associated with and control different and unrelated actions: 1) show the quick navigation menu; 2) exit a configuration sub-menu; and 3) put the device to sleep. As can be further seen, the status bar may also include a book icon (upper left corner). In some cases, selecting the book icon may provide bibliographic information on the content or provide the main menu or table of contents for the book, movie, playlist, or other content.

Figure 1C:
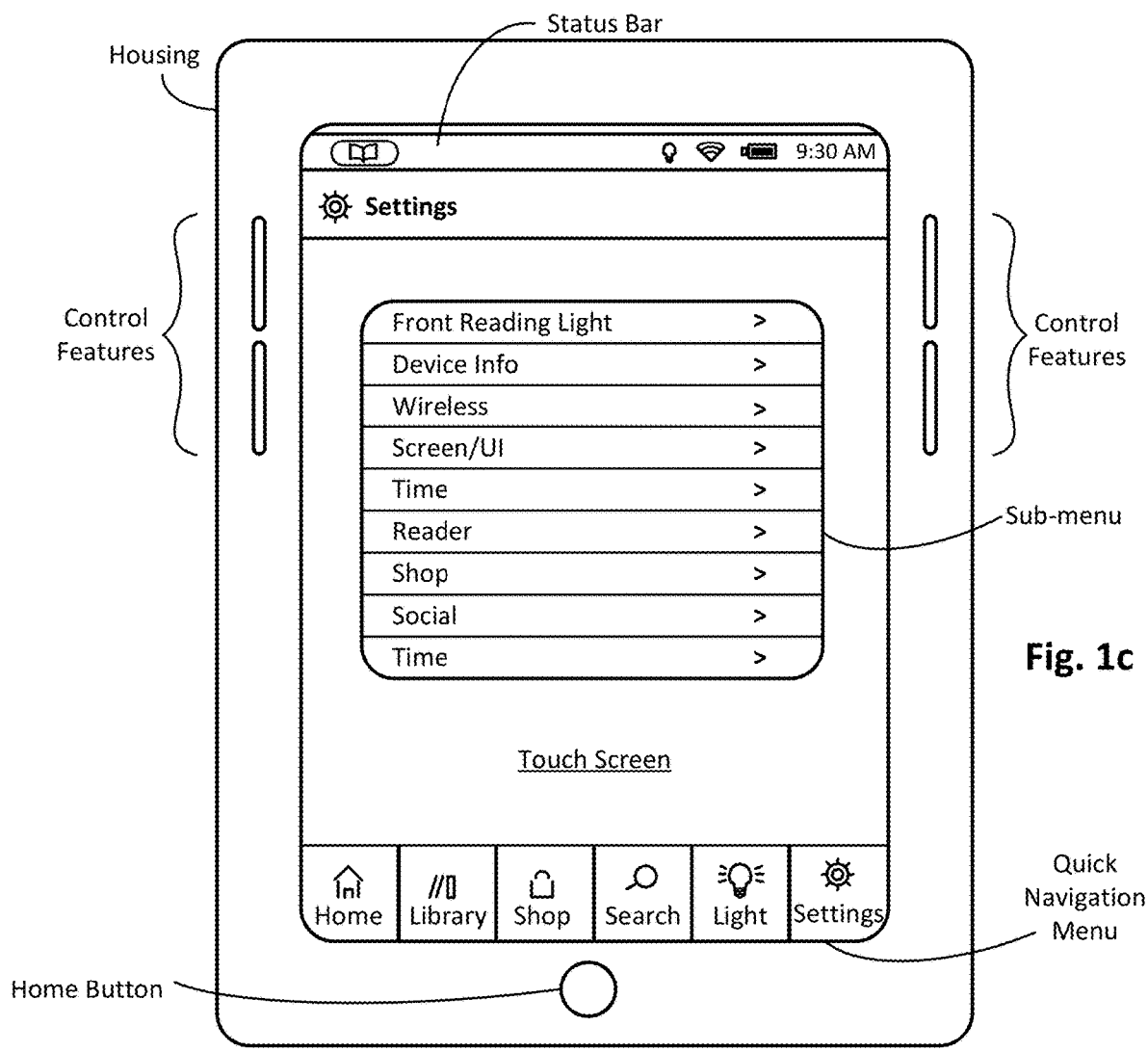
FIGS. 1c-d illustrate example configuration screen shots of the user interface of the electronic touch screen device shown in FIGS. 1a-b, configured in accordance with an embodiment of the present invention.
Figure 1D:
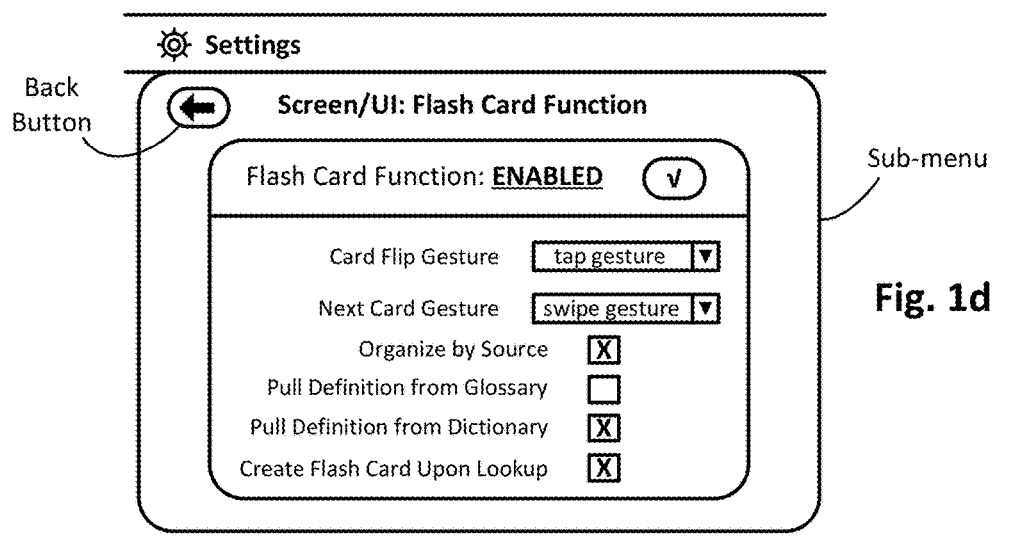

In one particular embodiment, a digital flash card function configuration sub-menu, such as the one shown in FIG. 1d, may be accessed by selecting the Settings option in the quick navigation menu, which causes the device to display the general sub-menu shown in FIG. 1c. From this general sub-menu, the user can select any one of a number of options, including one designated Screen/UI in this specific example case. Selecting this sub-menu option may cause the configuration sub-menu of FIG. 1d to be displayed, in accordance with an embodiment. In other example embodiments, selecting the Screen/UI option may present the user with a number of additional sub-options, one of which may include a so-called "digital flash card function" option, which may then be selected by the user so as to cause the digital flash card function configuration sub-menu of FIG. 1d to be displayed. Any number of such menu schemes and nested hierarchies can be used, as will be appreciated in light of this disclosure. In other example embodiments, the digital flash card function is hard-coded such that no configuration sub-menus are needed or otherwise provided (e.g., selecting text to create a digital flash card as described herein, with no user configuration needed). The degree of hard-coding versus user-configurability can vary from one embodiment to the next, and the claimed invention is not intended to be limited to any particular configuration scheme of any kind, as will be appreciated.

As will be appreciated, the various UI control features and sub-menus displayed to the user are implemented as touch screen controls in this example embodiment. Such UI screen controls can be programmed or otherwise configured using any number of conventional or custom technologies. In general, the touch screen display translates a touch (direct or hovering, by a user's hand, a stylus, or any other suitable implement) in a given location into an electrical signal which is then received and processed by the device's underlying operating system (OS) and circuitry (processor, display controller, etc.). In some instances, note that the user need not actually physically touch the touch sensitive device to perform an action. For example, the touch screen display may be configured to detect input based on a finger or stylus hovering over the touch sensitive surface (e.g., within 3 centimeters of the touch screen or otherwise sufficiently proximate to be detected by the touch sensing circuitry). Additional example details of the underlying OS and circuitry in accordance with some embodiments will be discussed in turn with reference to FIG. 2a.

The touch sensitive surface (or touch sensitive display, in this example case) can be any surface that is configured with touch detecting technologies, whether capacitive, resistive, acoustic, active-stylus, and/or other input detecting technology, including direct contact and/or proximate contact. In some embodiments, the screen display can be layered above input sensors, such as a capacitive sensor grid for passive touch-based input, such as with a finger or passive stylus contact in the case of a so-called in-plane switching (IPS) panel, or an electro-magnetic resonance (EMR) sensor grid for sensing a resonant circuit of a stylus. In some embodiments, the touch sensitive display can be configured with a purely capacitive sensor, while in other embodiments the touch screen display may be configured to provide a hybrid mode that allows for both capacitive input and EMR input, for example. In still other embodiments, the touch sensitive surface is configured with only an active stylus sensor. Numerous touch screen display configurations can be implemented using any number of known or proprietary screen based input detecting technologies. In any such embodiments, a touch sensitive controller may be configured to selectively scan the touch sensitive surface and/or selectively report user inputs detected directly on or otherwise sufficiently proximate to (e.g., within a few centimeters, or otherwise sufficiently close so as to allow detection) the detection surface (or touch sensitive display, in this example case).

As previously explained, and with further reference to FIGS. 1c and 1d, once the Settings sub-menu is displayed (FIG. 1c), the user can then select the Screen/UI option. In response to such a selection, the flash card function configuration sub-menu shown in FIG. 1d can be provided to the user, in accordance with one such example embodiment. The user can configure a number of features with respect to the flash card function, in this example case. For instance, the configuration sub-menu includes a UI check box that when checked or otherwise selected by the user, effectively enables the flash card function (shown in the enabled state); unchecking the box disables the function. Other embodiments may have the flash card function always enabled or enabled by a physical switch or button located on the device, for example.

In some embodiments, the flash card function may be associated with a card flip gesture that flips the flash card over to reveal the definition of a given word or phrase, and/or a card scrolling gesture that allows the user to move to the next flash card or otherwise scroll through the flash cards. In some embodiments, the user may configure the card flip gesture and/or the card scrolling gesture, and in this particular embodiment, the user has selected a tap gesture as the card flip gesture and a swipe gesture as the card scrolling gesture, each performed over a currently displayed flash card. Other embodiments may use different gestures, such as a two-contact swipe gesture, a distinguishable tap gesture, or any other recognizable gesture that can be used to distinctly indicate that either the next flash card or the definition of the current flash card is desired. As can be seen in this example, the desired gestures have been selected from drop-down menus, but any suitable UI selection mechanism can be used. In still other embodiments, note that a touch screen gesture is not necessarily required. For instance, in a desktop computing application having a non-touch display and a mouse, the so-called gestures may be performed by the user dragging a cursor (e.g., via a click-and-hold mouse-based drag) using a keyboard, mouse, or other suitable input mechanism. In a more general sense, any suitable user input techniques can be used to interact with the flash card function provided herein. For ease of description, examples provided herein focus on touch screen technologies.

With further reference to the example embodiment of FIG. 1d, the user has the option to organize flash cards by source, pull definitions from a glossary or dictionary, and to automatically create a flash card whenever a word or phrase is looked up. In some embodiments, organizing flash cards by source may include organizing them into virtual stacks or folders based on subject, course, semester, eBook, etc. As can be seen in the example shown in FIG. 1d, touch screen UI check boxes have been used to enable the options to organize flash cards by source, retrieve definitions from a dictionary, and to automatically create a flash card whenever a word or phrase is looked up. As mentioned above, many other gestures and/or features may be configured or edited with respect to the digital flash card function, and this example figure is not intended to limit the disclosure to any particular type of gestures and/or features.

As can be further seen, a back button arrow UI control feature may be provisioned on the screen for any of the menus provided, so that the user can go back to the previous menu, if so desired. Note that configuration settings provided by the user can be saved automatically (e.g., user input is saved as selections are made or otherwise provided). Alternatively, a save button or other such UI feature can be provisioned, which the user can engage as desired. The configuration sub-menu shown in FIG. 1d is presented merely as an example of how a digital flash card function may be configured by the user, and numerous other configurable or hard-codable aspects will be apparent in light of this disclosure. Note that in some embodiments the flash card function may be visually and/or aurally demonstrated or otherwise confirmed to the user via animations and/or sound effects. Such animations and sound effects may be used to provide clarity to the function being performed or otherwise enhance the user experience. In some embodiments, such animations and sound effects may be user-configurable, while in other embodiments they are hard-coded.

Figure 2A:
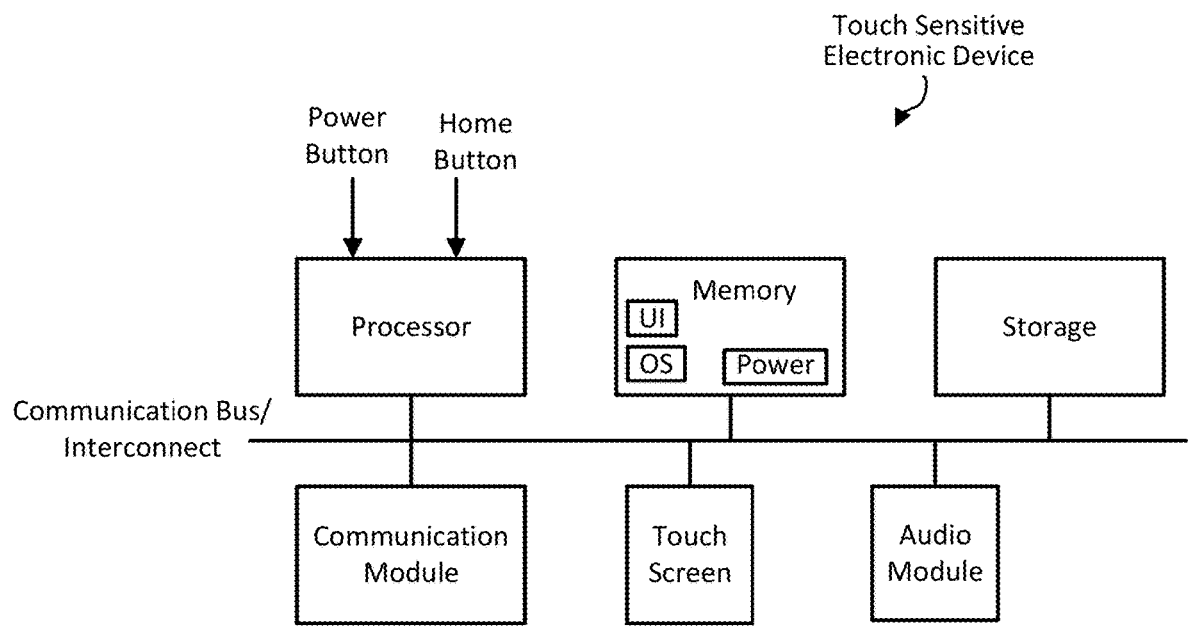
FIG. 2a illustrates a block diagram of an electronic touch screen device configured in accordance with an embodiment of the present invention.

FIG. 2a illustrates a block diagram of an electronic touch screen device configured in accordance with an embodiment of the present invention. As can be seen, this example device includes a processor, memory (e.g., RAM and/or ROM for processor workspace and storage), additional storage/memory (e.g., for content), a communications module, a touch screen, and an audio module. A communications bus and interconnect is also provided to allow inter-device communication. Other typical componentry and functionality not reflected in the block diagram will be apparent (e.g., battery, co-processor, etc.). The touch screen and underlying circuitry is capable of translating a user's contact (direct or proximate) with the touch screen into an electronic signal that can be manipulated or otherwise used to trigger a specific user interface action, such as those provided herein. The principles provided herein equally apply to any such touch sensitive devices. For ease of description, examples are provided with touch screen technology.

In this example embodiment, the memory includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc.), and encoded on a machine readable medium, that when executed by the processor (and/or co-processors), carries out the functionality of the device including a UI having a flash card function as variously described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., Texas Instruments OMAP4, dual-core ARM Cortex-A9, 1.5 GHz), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory). The display can be implemented, for example, with a 7 to 9 inch 1920×1280 IPS LCD touchscreen touch screen, or any other suitable display and touchscreen interface technology. The communications module can be, for instance, any suitable 802.11 b/g/n WLAN chip or chip set, which allows for connection to a local network, and so that content can be exchanged between the device and a remote system (e.g., content provider or repository depending on the application of the device). In some specific example embodiments, the device housing that contains all the various componentry measures about 7" to 9" high by about 5" to 6" wide by about 0.5" thick, and weighs about 7 to 8 ounces. Any number of suitable form factors can be used, depending on the target application (e.g., laptop, desktop, mobile phone, etc.). The device may be smaller, for example, for smartphone and tablet applications and larger for smart computer monitor and laptop and desktop computer applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The UI module can be, for example, based on touchscreen technology and the various example screen shots and use-case scenarios shown in FIGS. 1a, 1c-d, 3a-d, 4a-b, 5a-c, and 6a-d, and in conjunction with the digital flash card methodologies demonstrated in FIG. 7, which will be discussed in turn. The audio module can be configured to speak or otherwise aurally present, for example, a digital content sample, a selected eBook, or other textual content, and/or to provide verbal and/or other sound-based cues and prompts to guide the digital flash card function, as will be appreciated in light of this disclosure. Numerous commercially available text-to-speech modules can be used, such as Verbose text-to-speech software by NCH Software. In some example cases, if additional space is desired, for example, to store digital books or other content and media, storage can be expanded via a microSD card or other suitable memory expansion technology (e.g., 32 GBytes, or higher). Further note that although a touch screen display is provided, other embodiments may include a non-touch screen and a touch sensitive surface such as a track pad, or a touch sensitive housing configured with one or more acoustic sensors, etc.

Client-Server System

Figure 2B:
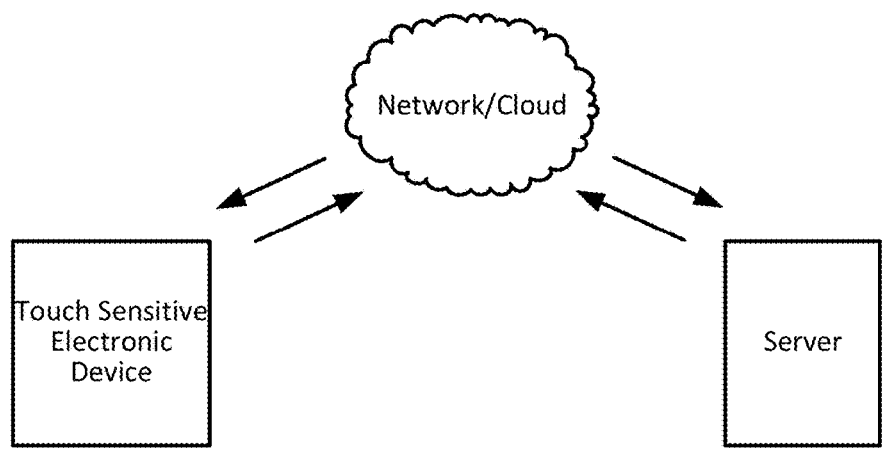
FIG. 2b illustrates a block diagram of a communication system including the electronic touch screen device of FIG. 2a, configured in accordance with an embodiment of the present invention.

FIG. 2b illustrates a block diagram of a communication system configured in accordance with an embodiment of the present invention. As can be seen, the system generally includes an electronic touch sensitive device (such as the one in FIG. 2a) that is capable of communicating with a server via a network/cloud. In this example embodiment, the electronic touch sensitive device may be, for example, an eBook reader, a mobile cell phone, a laptop, a tablet, desktop, or any other touch sensitive computing device. The network/cloud may be a public and/or private network, such as a private local area network operatively coupled to a wide area network such as the Internet. In this example embodiment, the server may be programmed or otherwise configured to receive content requests from a user via the touch sensitive device and to respond to those requests by performing a desired function or providing the user with requested or otherwise recommended content. Is some such embodiments, the server is configured to remotely provision a digital flash card function as provided herein to the touch screen device (e.g., via JavaScript or other browser based technology). In other embodiments, portions of the digital flash card methodology can be executed on the server and other portions of the methodology can be executed on the device. Numerous server-side/client-side execution schemes can be implemented to facilitate a digital flash card function in accordance with an embodiment, as will be apparent in light of this disclosure.

Digital Flash Card Creation/Viewing Mode Examples

Figure 3A:
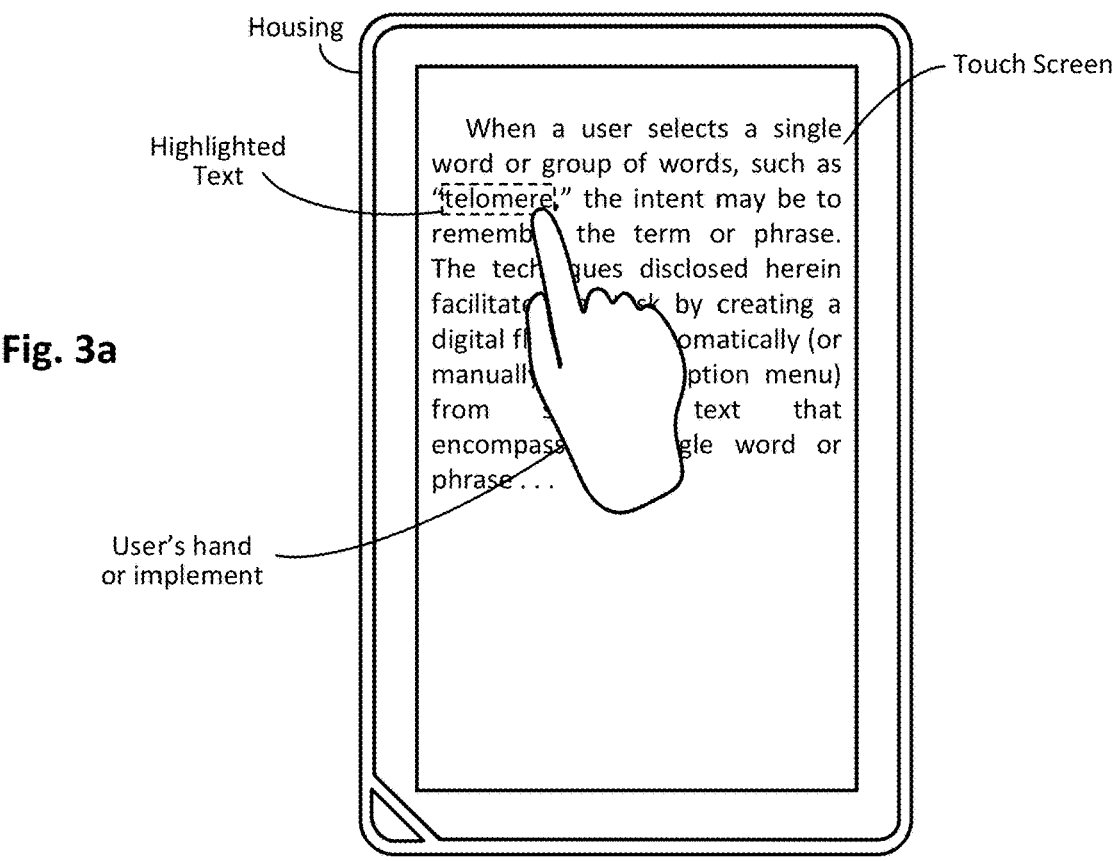
FIGS. 3a-d illustrate an example flash card creation mode of an electronic touch screen device, in accordance with an embodiment of the present invention.
Figure 3B:
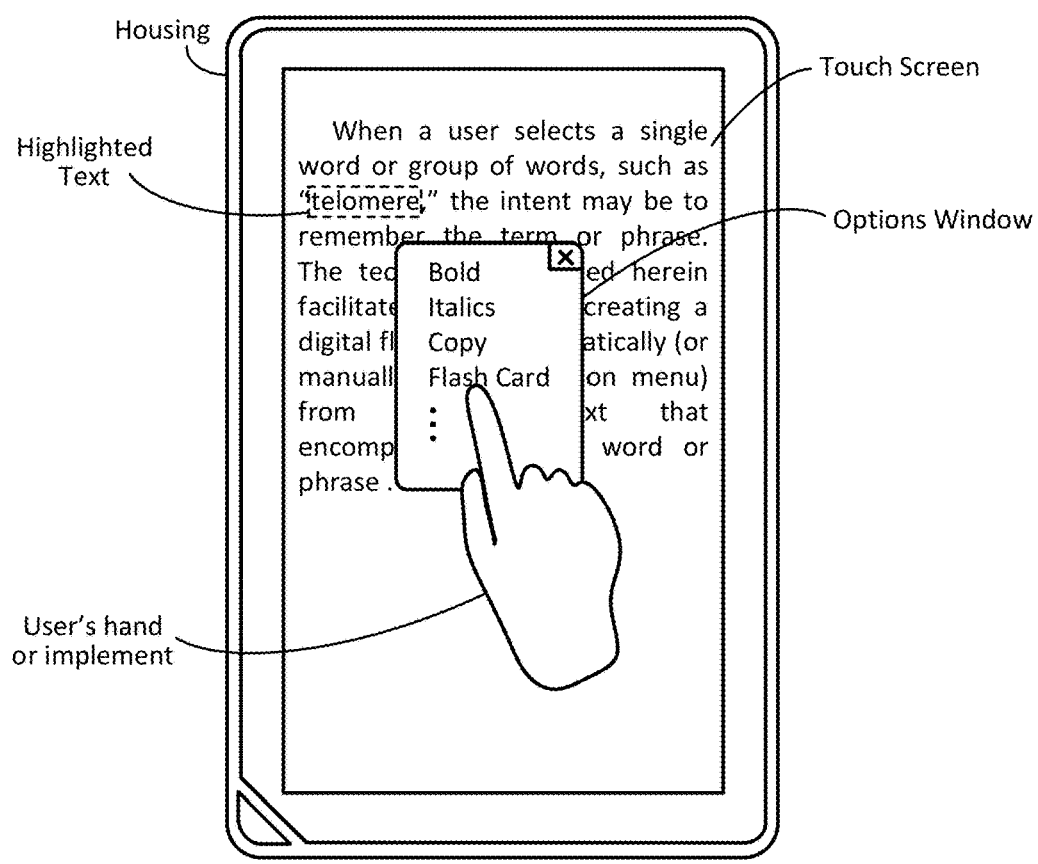

FIGS. 3a-d collectively illustrate an example flash card creation mode that can be applied to a touch sensitive display of an electronic device, in accordance with an embodiment of the present invention. As can be seen in FIG. 3a, the device housing surrounds the touch screen of the device, and the device is displaying a page of text to the user. The user can interact with the touch screen with fingers or any other suitable implement, and in some embodiments a word or phrase may be highlighted using a tap-and-drag gesture, or any other suitable highlighting mechanism. In this particular embodiment, the user is able to highlight content via a touch of the touch screen display (which may be part of a highlighting mode, for instance), and has highlighted the word "telomere" using a highlight gesture performed by the user's finger. Other highlighting mechanisms and schemes can be used as well, as will be appreciated in light of this disclosure. As can be seen in FIG. 3b, the flash card function of this specific example embodiment is configured (e.g., using the configuration sub-menu of FIG. 1d) to display an options menu or window to the user once a word or phrase is highlighted, rather than automatically creating a flash card of the highlighted word or phrase. As discussed above, the flash card function may be configured, in other embodiments, to automatically retrieve a definition and create a flash card whenever a word or short phrase is highlighted. The options menu or window in this particular example allows the user to perform an action on the highlighted text, including making the text bold or italicized, copying the text, or creating a flash card. As will be appreciated, fewer or additional options may be available to the user through such an options window and the options displayed in this example are for illustrative purposes only. In this specific example, the user selects the flash card option.

Figure 3C:
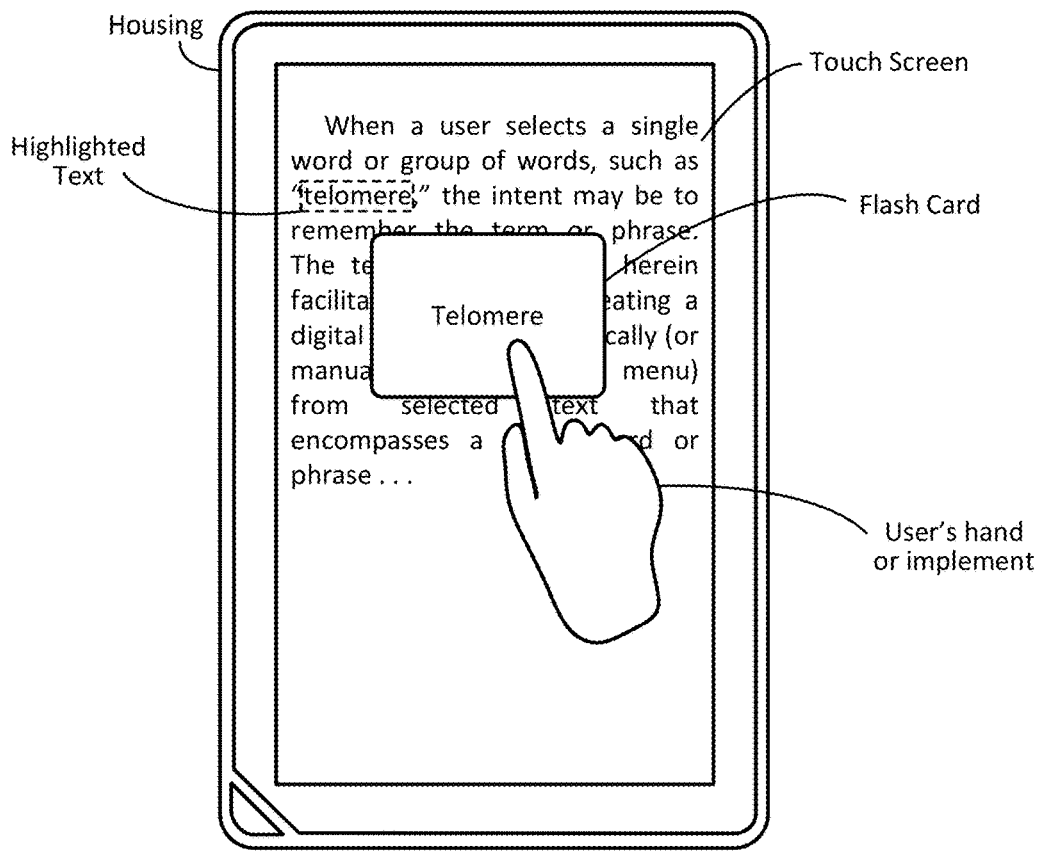
Figure 3D:
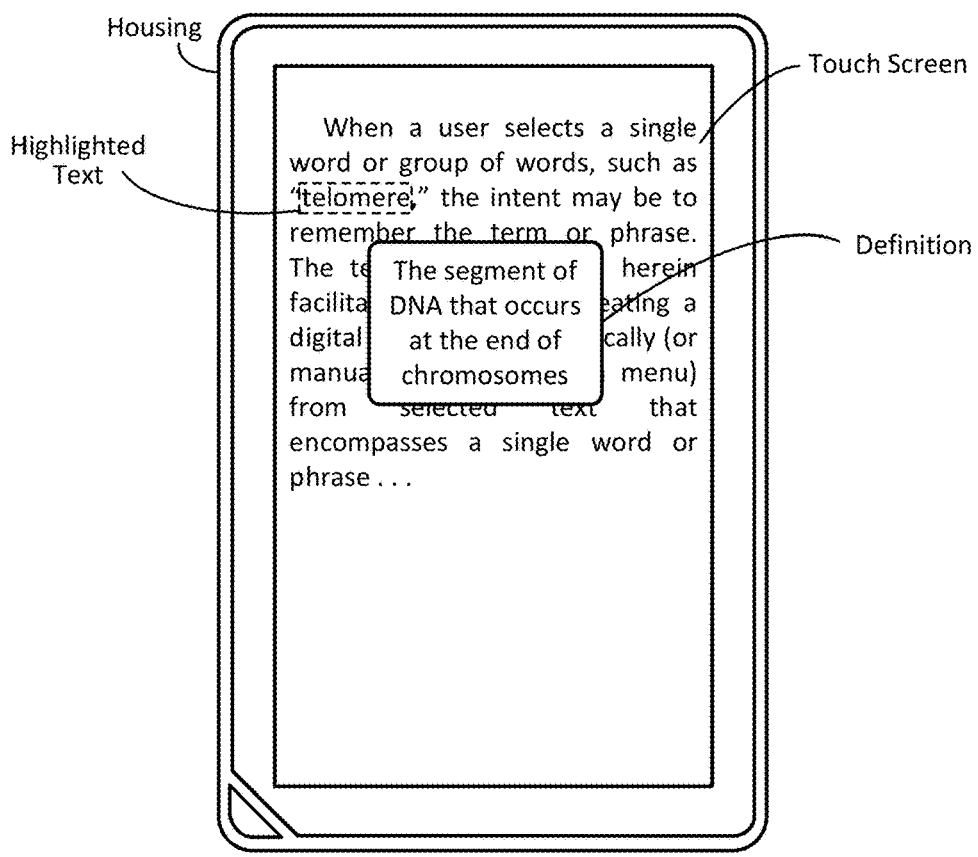

As can be seen in the example shown in FIG. 3c, once the flash card option has been selected, a flash card with the highlighted text may be displayed to the user. In this example embodiment, the user may perform a gesture over the flash card to flip the flash card and view the definition of the highlighted word or phrase. The card flipping gesture may be configured by the user (e.g., using the configuration sub-menu of FIG. 1d) or hard-coded, in some embodiments. In this particular example, the card flip gesture is associated with a single tap performed over the flash card, and the user performs this gesture in order to view the definition as shown in FIG. 3d. In some embodiments, flipping the flash card over to display the definition of a word or phrase may be accompanied by a suitable animation, such as one showing the card flipping over to display the definition.

Figure 4A:
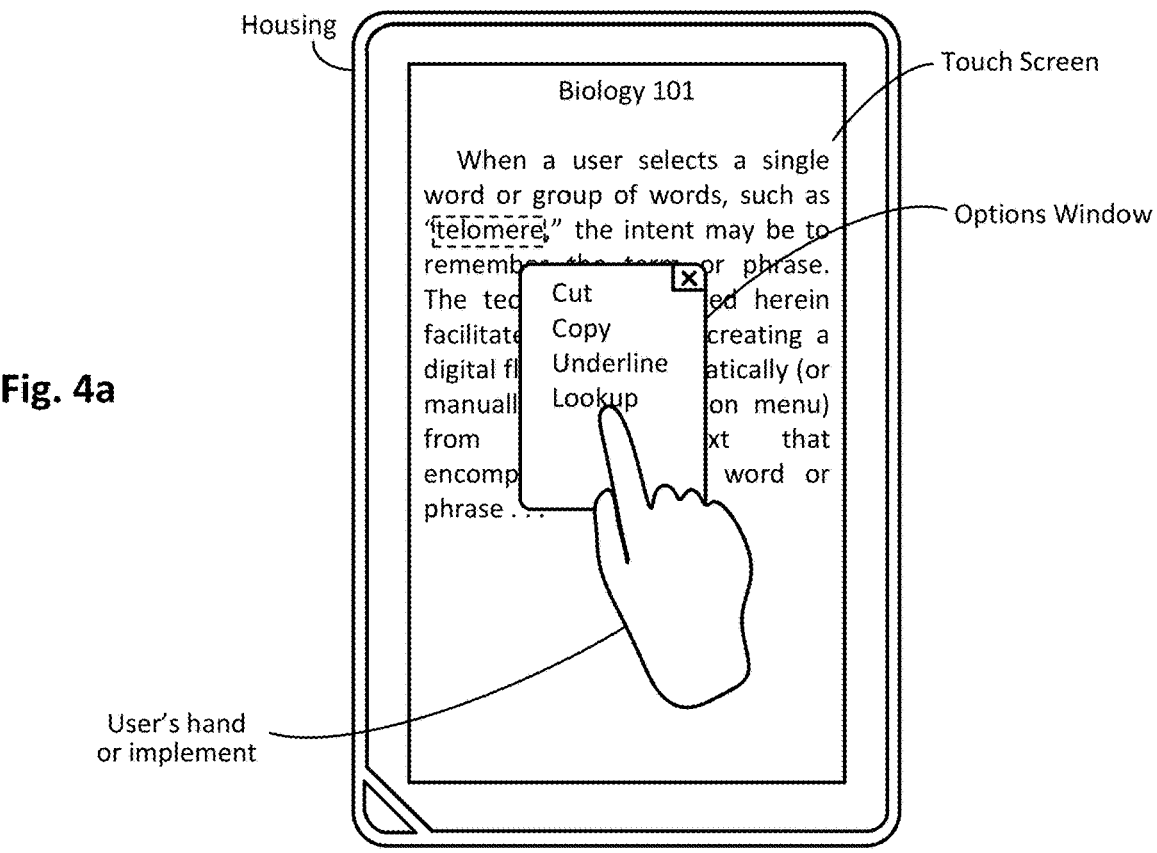
FIGS. 4a-b illustrate an example flash card creation mode of an electronic touch screen device, in accordance with another embodiment of the present invention.
Figure 4B:
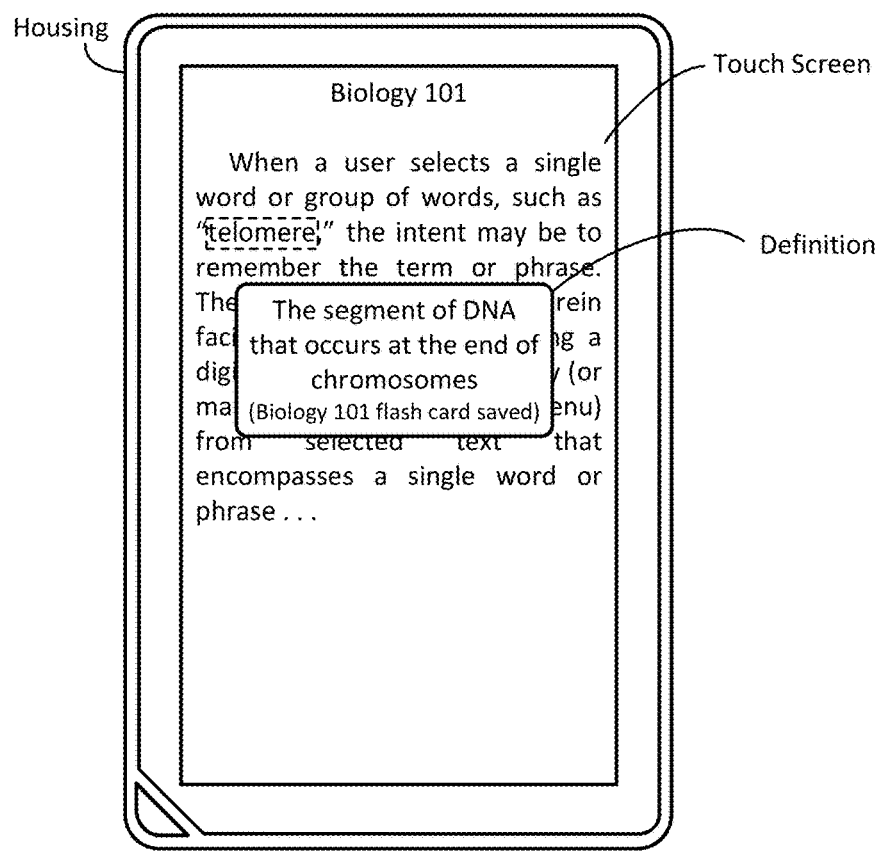

FIGS. 4a-b collectively illustrate an example flash card creation mode that can be applied to a touch sensitive display of an electronic device, in accordance with an embodiment of the present invention. As can be seen in FIG. 4a, the device housing surrounds the touch screen of the device, and the device is displaying a page of text to the user. The particular page of text, in this example embodiment, is a page from an eBook titled "Biology 101." The user can interact with the touch screen with fingers or any other suitable implement, and in some embodiments a word or phrase may be selected using a tap-and-drag gesture, or any other suitable selection mechanism. In this particular embodiment, the user has selected the word "telomere" using a selection gesture performed by the user's finger, and the selected word is highlighted. As can be seen in this example, the flash card function is configured (e.g., using the configuration sub-menu of FIG. 1d) to display an options window to the user once a word or phrase is selected, rather than automatically creating a flash card of the selected word or phrase. The options window in this particular example allows the user to perform an action on the selected text, including cutting the text, copying the text, underlining the text, or looking up the text. As will be appreciated, fewer or additional options may be available to the user through such an options window and the options displayed in this example are for illustrative purposes only. In this specific example, the user selects the option to look up the word "telomere."

In this particular example, the flash card function is further configured to create a flash card whenever a word or phrase is looked up and to organize the flash cards based on the source of the word or phrase being looked up. More specifically, as can be seen in FIG. 4b, once the user has selected to look up the meaning of a selected word, the definition is displayed to the user and a flash card of that word is automatically saved. A brief message may be displayed to the user stating, for example, that the flash card has been saved to a folder titled "Biology 101" for later review, in some embodiments.

Figure 5A:
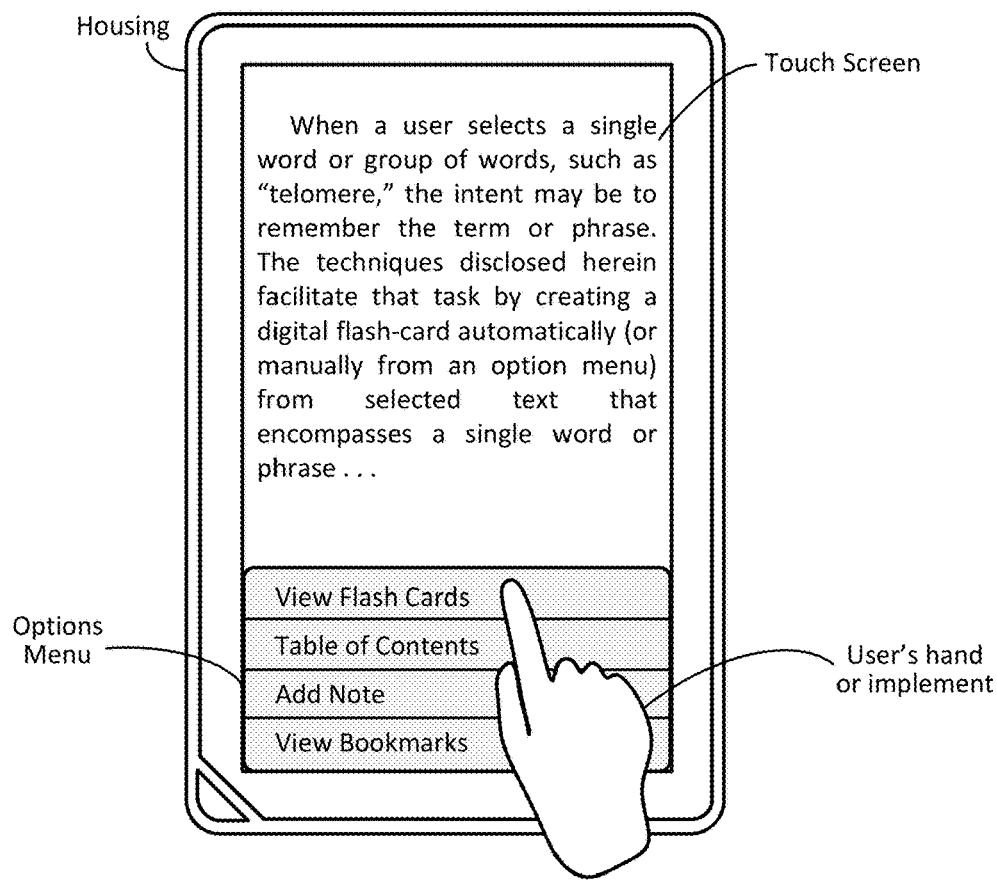
FIGS. 5a-c illustrate an example flash card viewing mode of an electronic touch screen device, in accordance with an embodiment of the present invention.
Figure 5B:
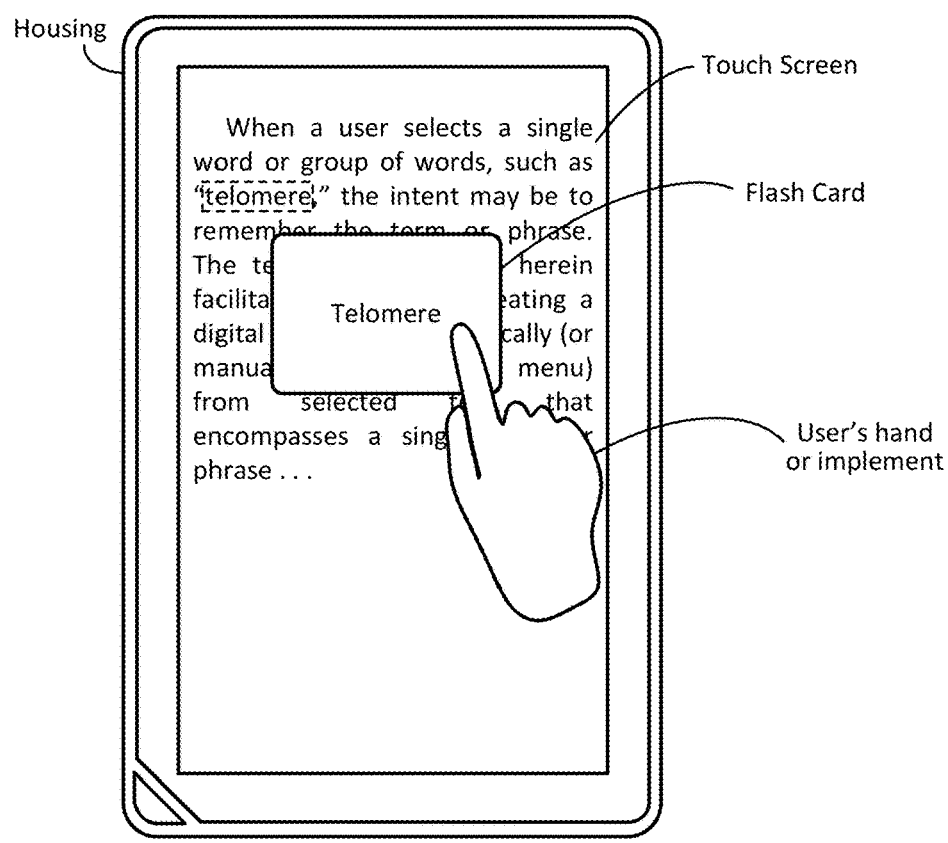
Figure 5C:
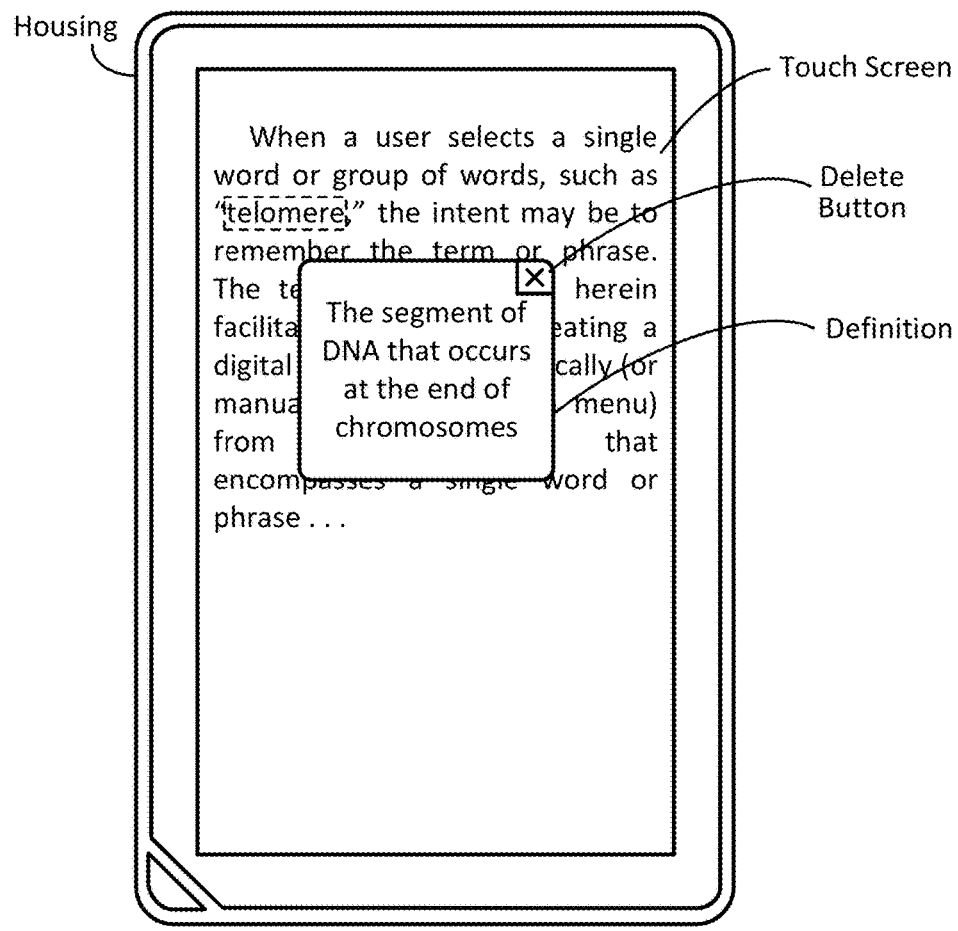

FIGS. 5a-c collectively illustrate an example flash card viewing mode that can be applied to a touch sensitive display of an electronic device, in accordance with an embodiment of the present invention. As can be seen in FIG. 5a, the device housing surrounds the touch screen of the device, and the device is displaying a page of text to the user. The user can interact with the touch screen with fingers or any other suitable implement, and in some embodiments a touch screen gesture or other user input may pull up an options menu including a number of labeled tabs and allowing the user to view flash cards, view the table of contents, add a note, view bookmarks, etc. As will be appreciated, fewer or additional options may be available to the user through such an options menu and the options displayed in this example are for illustrative purposes only. In this particular example, the user has selected the option to view flash cards. As can be seen in the example shown in FIG. 5b, once the user has chosen to view flash cards, the flash cards may be displayed on the touch screen device. In some embodiments, in order to provide the user with the context of the word or words, the flash card viewing mode may bring the user to the appropriate page of text and highlight the word or words displayed on the current flash card.

As discussed above, the user may perform a gesture over the flash card to flip the flash card and view the definition of the selected word or phrase, in some embodiments. The card flipping gesture may be configured by the user (e.g., using the configuration sub-menu of FIG. 1d) or hard-coded. In some cases, once the user has reviewed the flash card and seen the definition, the user may wish to delete the card. As shown in FIG. 5c, once the user performs the card flipping gesture, the definition may be displayed to the user along with a touch screen control feature allowing the user to delete the currently displayed flash card. In this particular example, the definition side of the flash card includes a delete button in the top right corner which allows the user to delete the flash card. In other embodiments, pressing the delete button of a physical or virtual keyboard may delete a currently displayed flash card. In some embodiments, tapping the screen outside of the flash card may close the flash card viewing mode and bring the user back into reading mode.

Figure 6A:
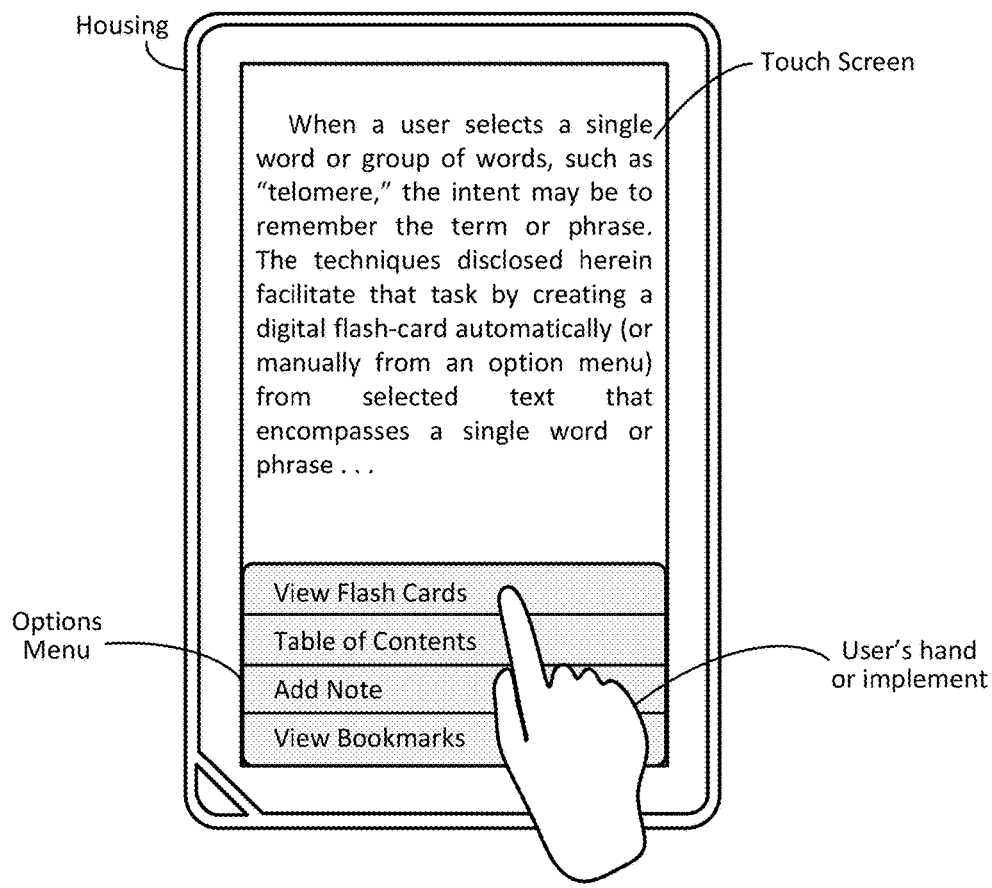
FIGS. 6a-d illustrate an example flash card viewing mode of an electronic touch screen device, in accordance with another embodiment of the present invention.
Figure 6B:
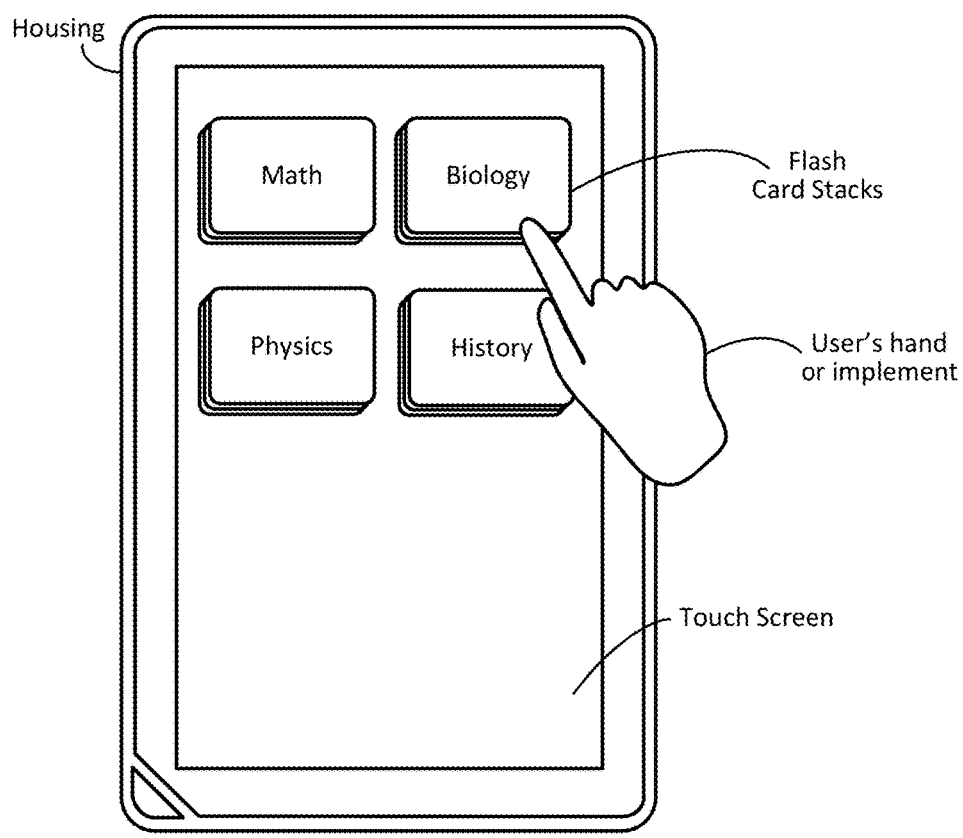

FIGS. 6a-d collectively illustrate an example flash card viewing mode that can be applied to a touch sensitive display of an electronic device, in accordance with another embodiment of the present invention. As can be seen in FIG. 6a, the device housing surrounds the touch screen of the device, and the device is displaying a page of text to the user. The user can interact with the touch screen with fingers or any other suitable implement, and in some embodiments a touch screen gesture or other user input may display an options menu including a number of labeled tabs allowing the user to view flash cards, view the table of contents, add a note, view bookmarks, etc. As will be appreciated, fewer or additional options may be available to the user through such an options menu and the options displayed in this example are for illustrative purposes only. In this particular example, the user has selected the option to view flash cards. The flash card function may be configured (e.g., using the configuration sub-menu of FIG. 1d) to organize the flash cards by subject, source, class, semester, etc. and in this particular embodiment the flash cards are organized by class. As can be seen in FIG. 6b, the flash card viewing mode is displaying four stacks of flash cards corresponding to four classes: math, biology, physics, and history. The flash cards and/or stacks of flash cards may be organized in folders, in some embodiments, and may be accessible to the user via file browsers and/or navigation menus. In this example embodiment, the user selects the stack of biology flash cards by performing a tap gesture on the touch screen display.

Figure 6C:
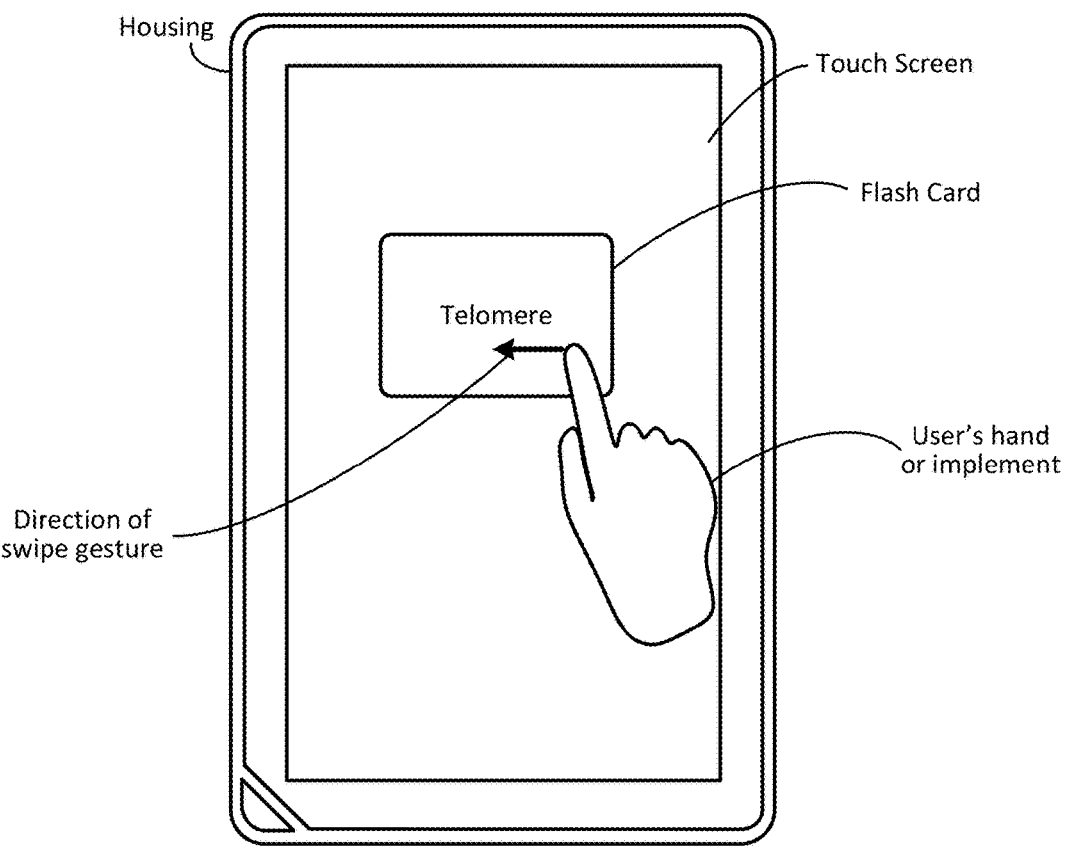
Figure 6D:
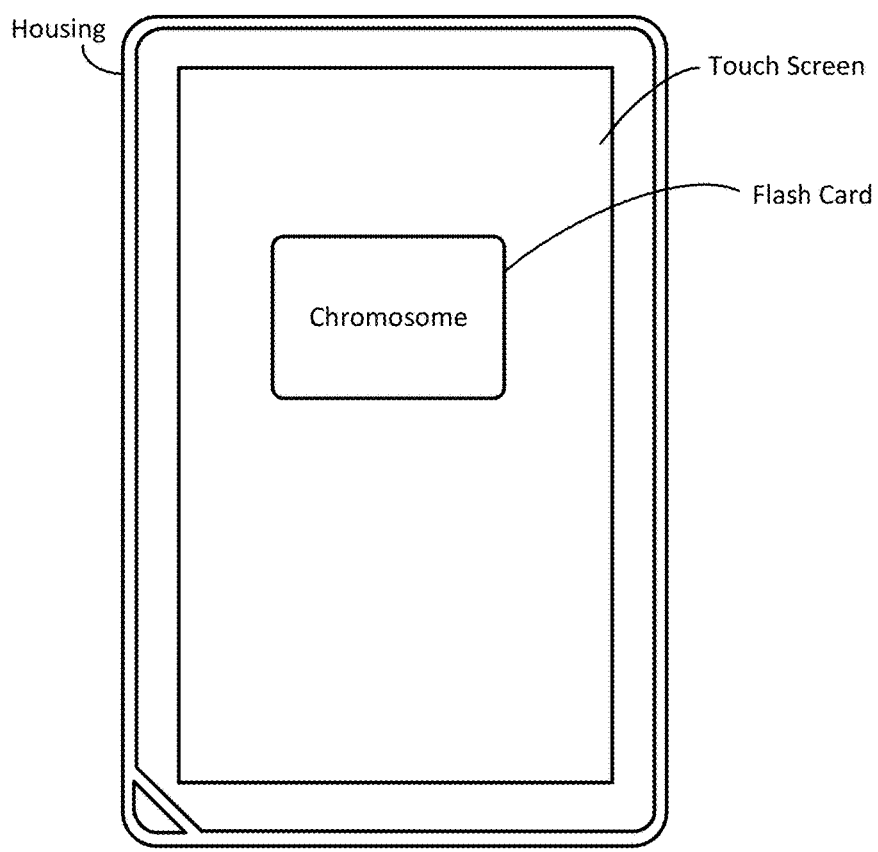

As can be seen in FIG. 6c, selecting the stack of biology flash cards displays the first flash card in that stack, which is the flash card for the word "telomere." In this example embodiment, the user may perform a gesture over the flash card in order to move to the next or previous card, as the case may be. The card scrolling gesture may be configured by the user (e.g., using the configuration sub-menu of FIG. 1d) or hard coded, in some embodiments. In this particular example, the card scrolling gesture is associated with a horizontal swipe gesture performed over the flash card, and the user performs this gesture in order to view the next card. As can be seen in FIG. 6d, the next flash card in the biology flash card stack is displayed to the user, which in this case is the flash card for the word "chromosome." In some embodiments, moving to the next or previous flash card may be accompanied by a suitable animation, such as one showing the current card gliding off the screen and the next card appearing from the right margin of the screen. Other suitable animations or graphics may be used to scroll through flash cards using various touch screen gestures, in some embodiments.

Methodology

Figure 7:
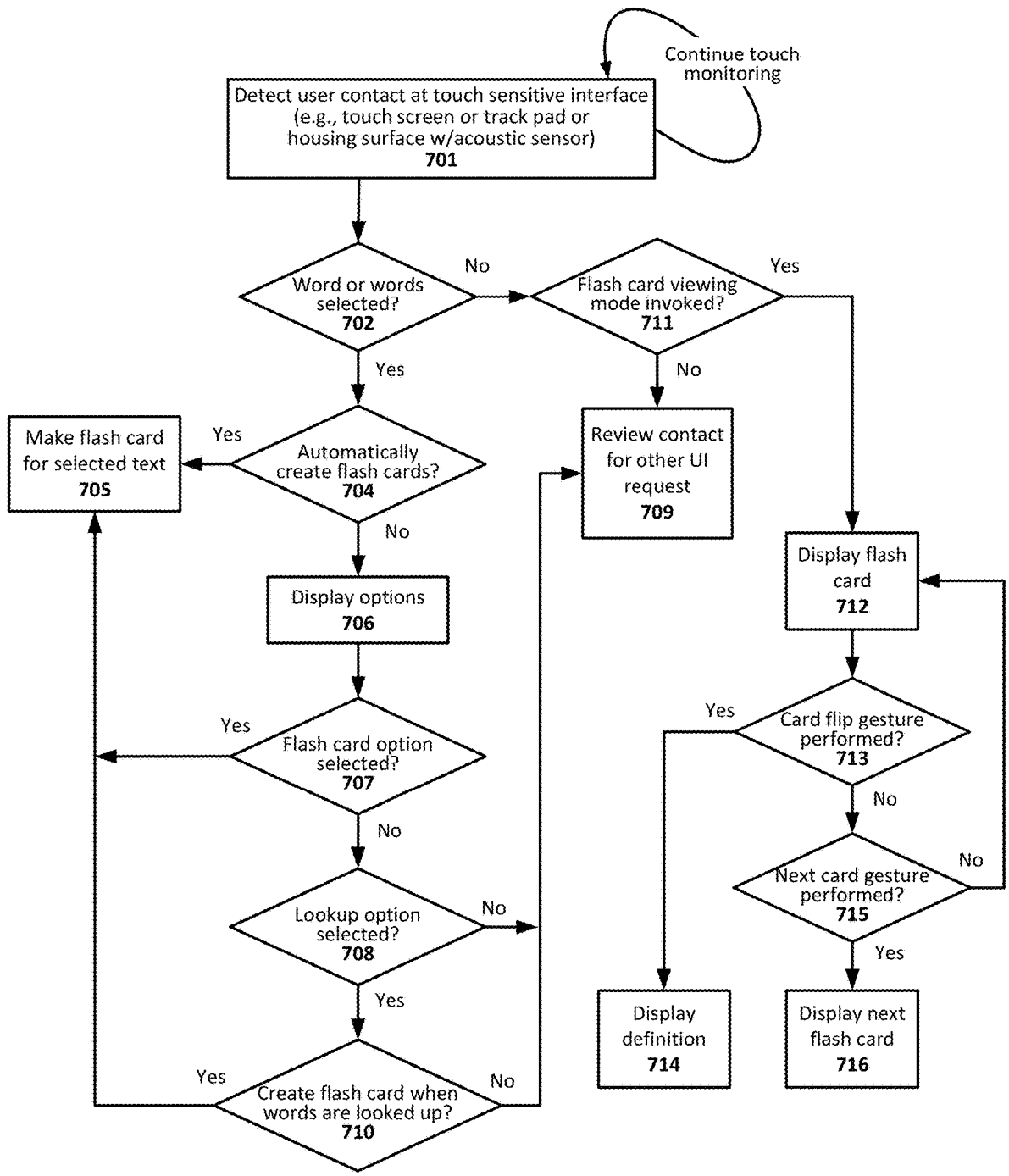
FIG. 7 illustrates a method for providing a digital flash card function in an electronic touch screen device, in accordance with an embodiment of the present invention.

FIG. 7 illustrates a method for providing a digital flash card function in an electronic touch screen device, in accordance with an embodiment of the present invention. This example methodology may be implemented, for instance, by the UI module of the example touch screen device shown in FIG. 2a, or the example touch screen device shown in FIG. 2b (e.g., with the UI provisioned to the client by the server). To this end, the flash card creation and/or viewing modes can be implemented in software, hardware, firmware, or any combination thereof, as will be appreciated in light of this disclosure.

As can be seen, the method generally includes sensing a user's input by a touch screen display. As soon as the user begins to swipe, drag or otherwise move a contact point, the UI code (and/or hardware) can assume a swipe gesture has been engaged and track the path of the contact point with respect to any fixed point within the touch screen until the user stops engaging the touch screen surface. The release point can also be captured by the UI as it may be used to commit the action started when the user pressed on the touch sensitive screen. In a similar fashion, if the user releases hold without moving the contact point, a tap or press or press-and-hold command may be assumed depending on the amount of time the user was continually pressing on the touch sensitive screen. These main detections can be used in various ways to implement UI functionality, including a flash card function as variously described herein, as will be appreciated in light of this disclosure.

In this example case, the method includes detecting 701 a user contact on the touch sensitive interface. As described above, the contact may be performed in any suitable manner using a stylus, the user's finger, or any other suitable implement, and it may be performed on a touch screen surface, a track pad, acoustic sensor, or other touch sensitive surface. The user contact monitoring is essentially continuous. In other embodiments, the user input may be, for example, a mouse-based signal, or any other user interface input. Once a user contact or other input has been detected, the method may continue with determining 702 whether a word or words have been selected. In some embodiments, the flash card function may be activated when a single word or a phrase including up to three words is selected by the user. If a word or words are selected, the method may continue with determining 704 whether the flash card function is configured to automatically create a flash card when word or words are selected. If automatic flash card creation is enabled, the method may continue with making 705 a digital flash card for the selected text. As discussed above, making a digital flash card may include, for example, pulling the definition of the word or phrase from a document glossary, a dictionary saved on the electronic device, an online dictionary or encyclopedia, a remote server, or some other data source. If automatic flash card creation is not enabled, the method may continue with displaying 706 one or more options that the user may select with respect to the selected word or phrase. In some embodiments, the options may be displayed in an options window similar to the one shown in FIG. 3b or 4a. The method may continue with determining 707 whether a flash card option has been selected from the options displayed at 706. If the flash card option has been selected, the method may continue with creating 705 a digital flash card for the selected text, as described above. If no flash card option has been selected, the method may continue with determining 708 whether a lookup option has been selected. If no lookup option has been selected, the method may continue with reviewing 709 the contact for other UI requests. If a lookup option has been selected, the method may continue with determining 710 whether the flash card function is configured to create a flash card whenever a word or phrase is looked up. If the flash card function is configured to create a flash card whenever a word or phrase is looked up, the method may continue with creating 705 a digital flash card for the selected text, as described above; otherwise the method may continue with reviewing 709 the contact for other UI requests.

If no word or words have been selected at 702, the method may continue with determining 711 whether a flash card viewing mode has been invoked. As discussed above, the flash card viewing mode may be invoked in a number of ways, including selecting a "view flash cards" options from an options menu, or selecting one or more flash card files from a folder and/or file browser. If the flash card viewing mode has not been invoked, the method may continue with reviewing 709 the contact for other UI requests. If the flash card viewing mode has been invoked, the method may continue with displaying 712 a flash card to the user. The method may continue with determining 713 whether a flash card flip gesture has been performed. In some embodiments, the flash card flip gesture may be hard-coded or configured by the user. For example, the user may configure the card flipping gesture to be a single tap gesture performed over the flash card. If the flash card flip gesture has been performed, the method may continue with displaying 714 the definition of the word or phrase on the current flash card. In some embodiments, displaying the definition of a word or phrase may include a graphic and/or animation, such as one showing the flash card flipping over to display the definition. If no flash card flip gesture is performed at 713, the method may continue with determining 715 whether a card scrolling gesture has been performed. In some embodiments, the card scrolling gesture may be hard-coded or configured by the user. For example, the user may configure the card scrolling gesture to be a horizontal swipe gesture performed over the flash card in order to view the next or previous flash card depending on the direction of the swipe gesture. If a card scrolling gesture is performed, the method may continue with displaying 716 the next flash card, otherwise the method may continue displaying 712 the current flash card.

Numerous variations and embodiments will be apparent in light of this disclosure. One example embodiment of the present invention provides a mobile device. The device includes a display for displaying digital content to a user, a processor, and a flash card creation mode executable on the processor. The flash card creation mode is configured to automatically create a flash card in response to a user highlighting a word or phrase in the digital content, the flash card having a question-answer construct within a given context, wherein a first side of the flash card represents the question portion of the construct and includes the highlighted word or phrase and a second side of the flash card represents the answer portion of the construct and includes data responsive to the question portion within the given context. In some cases, the given context comprises definitions and the data included in the answer portion of the construct includes a definition of the word or phrase. In some cases, the definition is pulled from a glossary associated with the digital content or a data source that is external to the digital content. In some cases, the flash card creation mode is further configured to automatically create a flash card in response to a selected word or phrase being the subject of a definition look-up. In some cases, the data responsive to the question portion and the given context is pulled from a data source that is external to the digital content. In some cases, the flash card creation mode is further configured to save the flash cards into organized groups. In some cases, the device includes a flash card viewing mode executable on the processor and configured to present flash cards created by the flash card creation mode and to flip a currently displayed flash card over in response to a flash card flip gesture. In one such case, the flash card viewing mode is further configured to present to the user a portion of digital content from which the word or phrase was highlighted. In some cases, the given context comprises foreign language study and the data included in the answer portion of the construct includes a foreign language equivalent of the word or phrase. In some cases, the given context comprises chemistry and the data included in the answer portion of the construct includes a chemical symbol (e.g., chemical or compound formula or equation or other shorthand notation) representative of the word or phrase. In some cases, the given context comprises mathematics and the data included in the answer portion of the construct includes a mathematical result representative of the word or phrase, the word or phrase including at least one mathematical operator. In some cases, the word or phrase includes non-textual content (e.g., numbers, symbols, characters, or other non-letter graphics, and combinations thereof).

Another example embodiment of the present invention provides a computing system including a display for displaying content to a user, a processor, and a flash card creation mode and a flash card viewing mode each executable on the processor. The flash card creation mode is configured to automatically create a flash card in response to a user highlighting a word or phrase in the digital content, the flash card having a question-answer construct within a given context, wherein a first side of the flash card represents the question portion of the construct and includes the highlighted word or phrase and a second side of the flash card represents the answer portion of the construct and includes data responsive to the question portion and the given context. The flash card viewing mode is configured to present flash cards created by the flash card creation mode. The given context comprises definitions and the data included in the answer portion of the construct includes a definition of the word or phrase. In some cases, the flash card creation mode is further configured to automatically create a flash card in response to a selected word or phrase being the subject of a definition look-up. In some cases, the definition is pulled from a glossary associated with the digital content or a data source that is external to the digital content. In some cases, the word or phrase includes non-textual content (e.g., numbers, symbols, characters, or other non-letter graphics, and combinations thereof).

Another example embodiment of the present invention provides a computer program product including a plurality of instructions non-transiently encoded thereon and executable by one or more processors to carry out a process. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In one such example embodiment, the process is configured to receive at an electronic device a selection highlighting gesture on a word or phrase comprising a portion of digital content, the word or phrase including letters, numbers, symbols, characters, or any combination thereof. The process is further configured to automatically retrieve an answer relevant to the highlighted word or phrase, and create a digital flash card including the highlighted word or phrase on a first side and the answer relevant to highlighted word or phrase on a second side. In some cases, automatically retrieving an answer comprises accessing at least one of a glossary within the digital content and a data source external to the digital content. In some cases, the process further comprises: display the digital flash card; and flip the digital flash card in response to a flip gesture performed on a touch sensitive surface of the electronic device. In some cases, the word or phrase includes non-textual content.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A mobile device, comprising:
a display for displaying digital content to a user;
a processor; and
a flash card creation mode executable on the processor and configured to:
   detect selection of a quantity of n words from the digital content displayed on the display, n≥1,
   make a determination that the quantity n is below a threshold quantity, and in response to making the determination, creating a digital flash card having a question-answer construct within a given context, wherein a first side of the digital flash card represents a question portion of the construct and includes the selected quantity of n words, and a second side of the digital flash card represents an answer portion of the construct and includes data responsive to the question portion within the given context, wherein the digital flash card is at least initially displayed on the display overlaying at least a portion of the digital content from which the quantity of n words were selected.

2. The device of claim 1 wherein the data included in the answer portion of the construct includes a definition of the selected quantity of n words.

3. The device of claim 2 wherein the definition is pulled from a glossary associated with the digital content.

4. The device of claim 1 wherein the digital flash card is created further in response to the selected quantity of n words being a subject of a definition look-up.

5. The device of claim 1 wherein the data responsive to the question portion is pulled from a data source that is external to the digital content.

6. The device of claim 1 wherein the flash card creation mode is further configured to
save the digital flash card into an existing group of digital flash cards, and
present the existing group as a virtual stack of flash cards on the display.

7. The device of claim 1 further comprising a flash card viewing mode executable on the processor and configured to
present the digital flash card, and
flip the digital flash card over in response to a flash card flip gesture.

8. The device of claim 7 wherein the flash card viewing mode is further configured to, upon execution, present to the user at least a portion of the digital content displayed on the display.

9. The device of claim 1 wherein the given context comprises foreign language study and the data included in the answer portion of the construct includes a foreign language equivalent of the selected quantity of n words.

10. The device of claim 1 wherein the given context comprises chemistry and the data included in the answer portion of the construct includes a chemical symbol representative of the selected quantity of n words.

11. The device of claim 1 wherein the given context comprises mathematics and the data included in the answer portion of the construct includes a mathematical result representative of the selected quantity of n words, the selected quantity of n words including at least one mathematical operator.

12. The device of claim 1 wherein the selected quantity of n words includes non-textual content.

13. A computing system, comprising:
a display for displaying digital content to a user;
a processor;
a flash card creation mode executable on the processor and configured to:
detect selection of a quantity of n words from the digital content displayed on the display, $n \geq 1$,
make a determination that the quantity n is below a threshold quantity, and
in response to making the determination, create a digital flash card having a question-answer construct within a given context, wherein a first side of the digital flash card represents a question portion of the construct and includes the selected quantity of n words, and a second side of the digital flash card represents an answer portion of the construct and includes data responsive to the question portion and the given context; and
a flash card viewing mode executable on the processor and configured to present the digital flash card;
wherein the digital flash card is initially displayed on the display overlaying at least a portion of the digital content from which the quantity of n words were selected; and
wherein the data included in the answer portion of the construct includes a definition of the selected quantity of n words.

14. The system of claim 13 wherein the digital flash card is created further in response to the selected quantity of n words being a subject of a definition look-up.

15. The system of claim 13 wherein the definition is pulled from a glossary associated with the digital content.

16. The system of claim 13 wherein the selected quantity of n words includes non-textual content.

17. A non-transitory computer program product comprising a plurality of instructions encoded thereon that when executed by one or more processors cause a process to be carried out, the process comprising:
detect, at an electronic device, selection of a quantity of n words from a given page of digital content, $n \geq 1$, the selected quantity of n words including letters, numbers, symbols, characters, or any combination thereof;
make a determination that the quantity n is below a threshold quantity;
retrieve an answer relevant to the selected quantity of n words;
in response to making the determination, create a digital flash card including the selected quantity of n words on a first side of the digital flash card, not including unselected content from the given page on the first side, and including the answer on a second side of the digital flash card; and
cause a display operably connected to the one or more processors to display the digital flash card overlaying at least a portion of the digital content.

18. The computer program product of claim 17 wherein retrieving the answer comprises accessing at least one of a data source other than the given page, a glossary within the digital content, and a data source external to the digital content.

19. The computer program product of claim 17 wherein the process further comprises flipping the digital flash card in response to a flip gesture performed on a touch sensitive surface of the electronic device.

20. The computer program product of claim 17 wherein the selected quantity of n words includes non-textual content.

* * * * *